(12) United States Patent
Suzumura et al.

(10) Patent No.: US 11,360,426 B2
(45) Date of Patent: Jun. 14, 2022

(54) ELECTROPHOTOGRAPHIC APPARATUS, PROCESS CARTRIDGE, AND CARTRIDGE SET

(71) Applicant: CANON KABUSHIKI KAISHA, Tokyo (JP)

(72) Inventors: Yoshitaka Suzumura, Shizuoka (JP); Hiroyuki Tomono, Shizuoka (JP); Takuya Mizuguchi, Shizuoka (JP); Osamu Matsushita, Kanagawa (JP); Shunsuke Matsushita, Kanagawa (JP); Masahiro Kurachi, Shizuoka (JP); Kazuhiro Yamauchi, Shizuoka (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 82 days.

(21) Appl. No.: 17/071,283

(22) Filed: Oct. 15, 2020

(65) Prior Publication Data
US 2021/0116860 A1   Apr. 22, 2021

(30) Foreign Application Priority Data

Oct. 18, 2019   (JP) .............................. JP2019-191588

(51) Int. Cl.
*G03G 21/18*   (2006.01)
*G03G 15/02*   (2006.01)
(Continued)

(52) U.S. Cl.
CPC ....... *G03G 21/1814* (2013.01); *G03G 9/0819* (2013.01); *G03G 9/0821* (2013.01);
(Continued)

(58) Field of Classification Search
CPC ............. G03G 21/1814; G03G 9/0819; G03G 9/0821; G03G 9/0823; G03G 9/08755; G03G 9/08782; G03G 15/0233
See application file for complete search history.

(56) References Cited

U.S. PATENT DOCUMENTS 6,697,587 B2   2/2004   Harada
6,864,030 B2   3/2005   Shirai et al.
(Continued)

FOREIGN PATENT DOCUMENTS

JP   2002003651 A   1/2002
JP   2003107781 A   4/2003
(Continued)

OTHER PUBLICATIONS

U.S. Appl. No. 17/065,258, Kohei Makisumi, filed Oct. 7, 2020.
(Continued)

*Primary Examiner* — Sandra Brase
(74) *Attorney, Agent, or Firm* — Venable LLP

(57) ABSTRACT

An electrophotographic apparatus comprising an electrophotographic photosensitive member, a charging device and a developing device, wherein the charging device comprises a conductive member arranged to be capable of contacting the electrophotographic photosensitive member, a conductive layer of the conductive member comprises a matrix domain structure, at least a part of the domains Dt is exposed at the conductive member outer surface, the matrix has a volume resistivity R1 of larger than $1.00\times10^{12}$ Ω·cm, the domains Dt has a volume resistivity of smaller than R1, the developing device comprises the toner, domains Dc formed of the crystalline material exist in a cross section of the toner, distances between adjacent wall surfaces of the domains Dc is from 30 to 1,100 nm, and a weight-average particle diameter D4 of the toner and distances Dms between
(Continued)

adjacent wall surfaces between the domains Dt satisfies D4≥Dms.

12 Claims, 4 Drawing Sheets

(51) Int. Cl.
  *G03G 9/087* (2006.01)
  *G03G 9/08* (2006.01)

(52) U.S. Cl.
  CPC ....... *G03G 9/0823* (2013.01); *G03G 9/08755* (2013.01); *G03G 9/08782* (2013.01); *G03G 15/0233* (2013.01)

(56) References Cited

U.S. PATENT DOCUMENTS

| | | |
|---|---|---|
| 7,799,398 B2 | 9/2010 | Nakamura et al. |
| 8,298,670 B2 | 10/2012 | Muranaka et al. |
| 8,449,975 B2 | 5/2013 | Hirakoso et al. |
| 8,503,916 B2 | 8/2013 | Anan et al. |
| 8,628,854 B2 | 1/2014 | Yamauchi et al. |
| 8,660,472 B2 | 2/2014 | Kurachi et al. |
| 8,668,987 B2 | 3/2014 | Yamauchi et al. |
| 8,715,830 B2 | 5/2014 | Yamada et al. |
| 8,771,818 B2 | 7/2014 | Nishioka et al. |
| 8,852,743 B2 | 10/2014 | Kikuchi et al. |
| 8,980,510 B2 | 3/2015 | Fujii et al. |
| 9,023,465 B2 | 5/2015 | Yamada et al. |
| 9,029,054 B2 | 5/2015 | Okuda et al. |
| 9,063,505 B2 | 6/2015 | Sekiya et al. |
| 9,069,267 B2 | 6/2015 | Kaku et al. |
| 9,086,643 B2 | 7/2015 | Kikuchi et al. |
| 9,128,403 B2 | 9/2015 | Yamauchi et al. |
| 9,146,482 B2 | 9/2015 | Watanabe et al. |
| 9,304,416 B2 | 4/2016 | Noguchi et al. |
| 9,360,789 B1 | 6/2016 | Masu et al. |
| 9,372,418 B2 | 6/2016 | Shida et al. |
| 9,372,419 B2 | 6/2016 | Tsuji et al. |
| 9,442,408 B2 | 9/2016 | Yamauchi et al. |
| 9,442,451 B2 | 9/2016 | Yamauchi et al. |
| 9,541,854 B2 | 1/2017 | Kikuchi et al. |
| 9,547,250 B2 | 1/2017 | Kikuchi et al. |
| 9,551,947 B2 | 1/2017 | Hiroko et al. |
| 9,551,949 B2 | 1/2017 | Yamauchi et al. |
| 9,556,359 B2 | 1/2017 | Suzumura et al. |
| 9,581,931 B2 | 2/2017 | Yamada et al. |
| 9,599,913 B2 | 3/2017 | Nishioka et al. |
| 9,599,915 B2 | 3/2017 | Anezaki et al. |
| 9,639,009 B2 | 5/2017 | Yamaguchi et al. |
| 9,651,888 B2 | 5/2017 | Muranaka et al. |
| 9,665,028 B2 | 5/2017 | Arimura et al. |
| 9,665,029 B2 | 5/2017 | Hino et al. |
| 9,740,133 B2 | 8/2017 | Yamauchi et al. |
| 9,811,009 B2 | 11/2017 | Yamada et al. |
| 9,811,021 B2 | 11/2017 | Muranaka et al. |
| 9,851,646 B2 | 12/2017 | Tomono et al. |
| 9,897,931 B2 | 2/2018 | Nishioka et al. |
| 9,958,802 B2 | 5/2018 | Kikuchi et al. |
| 9,964,874 B2 | 5/2018 | Suzumura et al. |
| 9,964,881 B2 | 5/2018 | Ikejiri et al. |
| 9,964,914 B2 | 5/2018 | Arimura et al. |
| 9,977,353 B2 | 5/2018 | Nishioka et al. |
| 10,018,927 B2 | 7/2018 | Yamada et al. |
| 10,018,934 B2 | 7/2018 | Yamada et al. |
| 10,108,129 B2 | 10/2018 | Yamaguchi et al. |
| 10,280,148 B2 | 5/2019 | Nishioka et al. |
| 10,416,588 B2 | 9/2019 | Masu et al. |
| 10,488,777 B2 | 11/2019 | Terauchi et al. |
| 10,649,350 B2 | 5/2020 | Yamaguchi et al. |
| 10,678,154 B2 | 6/2020 | Takashima et al. |
| 10,678,158 B2 | 6/2020 | Kikuchi et al. |
| 2003/0049554 A1* | 3/2003 | Ohmura ............. G03G 9/08782 430/110.2 |
| 2012/0251171 A1 | 10/2012 | Muranaka et al. |
| 2012/0308261 A1 | 12/2012 | Tsuru et al. |
| 2013/0281276 A1 | 10/2013 | Watanabe et al. |
| 2014/0072343 A1 | 3/2014 | Masu et al. |
| 2014/0080691 A1 | 3/2014 | Kurachi et al. |
| 2014/0287354 A1* | 9/2014 | Kawamura ......... G03G 9/08755 430/109.3 |
| 2015/0331346 A1 | 11/2015 | Yamauchi et al. |
| 2017/0102633 A1* | 4/2017 | Yoshidome ......... G03G 21/1814 |
| 2020/0225593 A1 | 7/2020 | Yamaguchi et al. |
| 2020/0310264 A1 | 10/2020 | Kurachi et al. |
| 2020/0310265 A1 | 10/2020 | Nishioka et al. |
| 2020/0310266 A1 | 10/2020 | Kikuchi et al. |
| 2021/0026295 A1 | 1/2021 | Yamada et al. |
| 2021/0033996 A1 | 2/2021 | Kikuchi et al. |
| 2021/0041796 A1 | 2/2021 | Nishioka et al. |

FOREIGN PATENT DOCUMENTS

| | | |
|---|---|---|
| JP | 2003280246 A | 10/2003 |
| JP | 2005049630 A | 2/2005 |
| JP | 2012068623 A | 4/2012 |
| JP | 2017107169 A | 6/2017 |
| JP | 2017207680 A | 11/2017 |
| JP | 2017211648 A | 11/2017 |
| JP | 2018077385 A | 5/2018 |
| JP | 2019045578 A | 3/2019 |

OTHER PUBLICATIONS

U.S. Appl. No. 17/069,919, Tsutomu Nishida, filed Oct. 14, 2020.
U.S. Appl. No. 17/070,054, Yuka Ishiduka, filed Oct. 14, 2020.
U.S. Appl. No. 17/070,085, Fumiyuki Hiyama, filed Oct. 14, 2020.
U.S. Appl. No. 17/070,179, Kaname Watariguchi, filed Oct. 14, 2020.
U.S. Appl. No. 17/071,103, Noriyoshi Umeda, filed Oct. 15, 2020.
U.S. Appl. No. 17/071,109, Shohei Kototani, filed Oct. 15, 2020.
U.S. Appl. No. 17/071,227, Kosuke Fukudome, filed Oct. 15, 2020.
U.S. Appl. No. 17/071,246, Tomohiro Unno, filed Oct. 15, 2020.
U.S. Appl. No. 17/071,535, Hiroyuki Tomono, filed Oct. 15, 2020.
U.S. Appl. No. 17/071,540, Tsuneyoshi Tominaga, filed Oct. 15, 2020.

* cited by examiner

ELECTROPHOTOGRAPHIC APPARATUS, PROCESS CARTRIDGE, AND CARTRIDGE SET

BACKGROUND OF THE INVENTION

Field of the Invention

The present disclosure is directed to providing an electrophotographic apparatus, a process cartridge, and a cartridge set.

Description of the Related Art

In recent years, image forming apparatuses such as copying machines and printers are required to have a longer service life due to diversification in terms of usage purposes and usage environments thereof.

In an electrophotographic apparatus, a conductive member is used as a charging member. As for the structure of the conductive member, a structure including a conductive support and including a conductive layer provided on a support is known. The conductive member plays a role in transporting charge from the conductive support to the surface of the conductive member and applying the charge to a contact object by discharging or triboelectric charging.

The conductive member as a charging member is a member that causes discharging between itself and an electrophotographic photosensitive member, and charges the surface of the electrophotographic photosensitive member.

The conductive member is required to be able to perform uniform charging on the electrophotographic photosensitive member.

When the conductive member is contaminated with a developer (hereinafter referred to as a toner), charging performance of the conductive member does not fully exhibit desired characteristics. In particular, when the process cartridge is designed to have a longer service life, the performance thereof tends to significantly deteriorate.

Japanese Patent Application Publication No. 2002-3651 discloses: a rubber composition having a sea-island structure including a polymer continuous phase composed of an ion conductive rubber material having as a main component a raw material rubber A having a volume resistivity of not more than $1\times10^{12}$ Ω·cm and a polymer particle phase composed of an electron conductive rubber material obtained by blending a raw material rubber B with conductive particles so as to render the same conductive; and a charging member having an elastic body layer formed of the rubber composition.

Japanese Patent Application Publication No. 2017-107169 discloses a toner in which a crystalline polyester resin thereof has a small domain size and the presence state thereof is defined.

SUMMARY OF THE INVENTION

The inventors have confirmed that the charging member according to Japanese Patent Application Publication No. 2002-3651 has a small voltage dependence, exhibits small environmental change, and has an electrical resistance that is stable over time. However, it has been found that there is still room for improvement in prolonging service life of an image forming process, which has been attempted in recent years.

Specifically, when the charging member according to Japanese Patent Application Publication No. 2002-3651 is used to form an electrophotographic image, a phenomenon of contamination of the charging member by the toner is observed. Hence, minute potential non-uniformities, which are formed on the surface of a component to be charged, cannot be sufficiently leveled by the time of a charging step, whereby there are cases where a fine line image disturbance is caused due to potential non-uniformities.

In particular, in recent years, as disclosed in Japanese Patent Application Publication No. 2017-107169, the low-temperature fixability of a toner has further improved, and when such a toner is used, adhesion of the toner to the charging member is more likely to occur.

The present disclosure is directed to providing an electrophotographic apparatus, a process cartridge, and a cartridge set with which low-temperature fixability is achieved and non-uniformity of fine lines does not easily occur even after use at a high speed for a long time in a low temperature and low humidity environment.

According to the present disclosure,
an electrophotographic apparatus comprising:
an electrophotographic photosensitive member;
a charging device for charging a surface of the electrophotographic photosensitive member; and
a developing device for developing an electrostatic latent image formed on the surface of the electrophotographic photosensitive member with a toner to form a toner image on the surface of the electrophotographic photosensitive member, wherein
the charging device comprises a conductive member arranged to be capable of contacting the electrophotographic photosensitive member,
the conductive member comprises a support having a conductive outer surface and a conductive layer provided on the outer surface of the support,
the conductive layer comprises a matrix and a plurality of domains Dt dispersed in the matrix,
the matrix contains a first rubber,
each of the domains Dt contain a second rubber and an electronic conductive agent,
at least a part of the domains Dt is exposed at the outer surface of the conductive member,
the outer surface of the conductive member is composed of at least the matrix and the domains Dt exposed at the outer surface of the conductive member,
the matrix has a volume resistivity R1 of larger than $1.00\times10^{12}$ Ω·cm,
the domains Dt has a volume resistivity R2 of smaller than the volume resistivity R1 of the matrix,
the developing device comprises the toner,
the toner comprises a toner particle containing a binder resin and a crystalline material,
in observation of a cross section of the toner under a scanning transmission electron microscope, domains Dc formed of the crystalline material exist,
an arithmetic average value of distances between adjacent wall surfaces of the domains Dc is from 30 to 1,100 nm, and
when a weight-average particle diameter of the toner is D4 and an arithmetic average value of distances between adjacent wall surfaces between the domains Dt in the conductive layer when the outer surface of the conductive member is observed is Dms, Formula (1) below is satisfied:

$$D4 \geq Dms \quad (1)$$

is provided.

According to other embodiment of present disclosure,
a process cartridge detachably attachable to a main body of an electrophotographic apparatus, wherein the process cartridge comprises a charging device for charging a surface of an electrophotographic photosensitive member and a developing device for developing an electrostatic latent image formed on the surface of the electrophotographic photosensitive member with a toner to form a toner image on the surface of the electrophotographic photosensitive member, the charging device comprises a conductive member that is arranged to be capable of contacting the electrophotographic photosensitive member, the conductive member comprises a support having a conductive outer surface and a conductive layer provided on the outer surface of the support, the conductive layer comprises a matrix and a plurality of domains Dt dispersed in the matrix, the matrix contains a first rubber, each of the domains Dt contain a second rubber and an electronic conductive agent, at least a part of the domains Dt is exposed at the outer surface of the conductive member, the outer surface of the conductive member is composed of at least the matrix and the domains Dt exposed at the outer surface of the conductive member, the matrix has a volume resistivity R1 of larger than $1.00 \times 10^{12}$ Ω·cm, the domains Dt has a volume resistivity R2 of smaller than the volume resistivity R1 of the matrix, the developing device comprises the toner, the toner comprises a toner particle containing a binder resin and a crystalline material, in observation of a cross section of the toner under a scanning transmission electron microscope, domains Dc formed of the crystalline material exist, an arithmetic average value of distances between adjacent wall surfaces of the domains Dc is from 30 to 1,100 nm, and when a weight-average particle diameter of the toner is D4 and an arithmetic average value of distances between adjacent wall surfaces between the domains Dt in the conductive layer when the outer surface of the conductive member is observed is Dms, Formula (1) below is satisfied:

$$D4 \geq Dms \tag{1}$$

is provided.

According to other embodiment of present disclosure, a cartridge set having a first cartridge and a second cartridge detachably attachable to a main body of an electrophotographic apparatus, wherein the first cartridge comprises a charging device for charging a surface of an electrophotographic photosensitive member and a first frame for supporting the charging device, the second cartridge comprises a toner container containing a toner for developing an electrostatic latent image formed on the surface of the electrophotographic photosensitive member to form a toner image on the surface of the electrophotographic photosensitive member, the charging device comprises a conductive member that is arranged to be capable of contacting the electrophotographic photosensitive member, the conductive member comprises a support having a conductive outer surface and a conductive layer provided on the outer surface of the support, the conductive layer comprises a matrix and a plurality of domains Dt dispersed in the matrix, the matrix contains a first rubber, each of the domains Dt contain a second rubber and an electronic conductive agent, at least a part of the domains Dt is exposed at the outer surface of the conductive member, the outer surface of the conductive member is composed of at least the matrix and the domains Dt exposed at the outer surface of the conductive member, the matrix has a volume resistivity R1 of larger than $1.00 \times 10^{12}$ Ω·cm, the domains Dt has a volume resistivity R2 of smaller than the volume resistivity R1 of the matrix, the toner comprises a toner particle containing a binder resin and a crystalline material, in observation of a cross section of the toner under a scanning transmission electron microscope, domains Dc formed of the crystalline material exist, an arithmetic average value of distances between adjacent wall surfaces of the domains Dc is from 30 to 1,100 nm, and when a weight-average particle diameter of the toner is D4 and an arithmetic average value of distances between adjacent wall surfaces between the domains Dt in the conductive layer when the outer surface of the conductive member is observed is Dms, Formula (1) below is satisfied:

$$D4 \geq Dms \tag{1}$$

is provided.

According to the present disclosure, an electrophotographic apparatus, a process cartridge, and a cartridge set with which low-temperature fixability is achieved and non-uniformity of fine lines does not easily occur even after use at a high speed for a long time in a low temperature and low humidity environment can be obtained.

Further features of the present invention will become apparent from the following description of exemplary embodiments with reference to the attached drawings.

DESCRIPTION OF THE EMBODIMENTS

Figure 1:
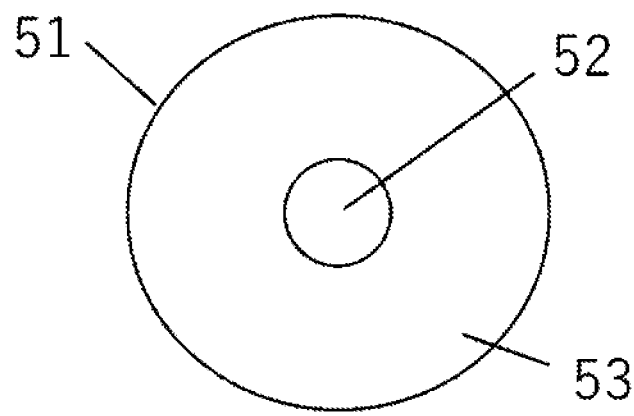
FIG. 1 is a cross-sectional view of a charging roller in a direction orthogonal to a longitudinal direction.

The statement "from XX to YY" and "XX to YY" indicating a numerical range refer to a numerical range including the lower limit and the upper limit which are end points unless otherwise noted.

When the numerical range is described stepwise, the upper limit and the lower limit of each numerical range can be arbitrarily combined.

Due to a long service life of an image forming device and a process cartridge, a toner adheres to a conductive member as a charging means, and thus parts having favorable charging characteristics and parts having poor charging characteristics occur in the conductive member, and the charging characteristics become non-uniform. Therefore, charging on an electrophotographic photosensitive member becomes non-uniform. In such a state, when a latent image of an image to be printed on the electrophotographic photosensitive member is drawn, the latent image is easily disturbed. For example, when a fine line is drawn, thick parts and thin parts are formed in the fine line latent image due to non-uniform charging. As a result, the thickness of the fine line of the obtained image becomes non-uniform, and quality of a text image deteriorates.

Therefore, the inventors thought that it is important to reduce adhesion of the toner to the conductive member in order to stably output a fine line without disturbance.

The inventors conducted extensive studies to generate an electrostatic repulsive force between the toner and the conductive member in order to reduce adhesion of the toner to the conductive member as the charging member. As a result, they found that the above requirements can be met favorably according to a combination of a conductive member and a toner having the following configurations.

The reason for this will be described below.

First, a discharge phenomenon occurring between a conductive member and an electrophotographic photosensitive member will be described.

Generally, in the fine gap near a contact region between the conductive member and the electrophotographic photosensitive member, discharging occurs in a region in which the relationship between the strength of the electric field and the distance of the fine gap satisfies Paschen's law.

It has been ascertained that, in an electrophotographic process in which discharging is caused while the electrophotographic photosensitive member is rotated, when one point on the surface of the conductive member is tracked over time, discharging does not occur continuously from the starting point to the ending point of the discharging, but discharging is repeated a plurality of times.

In the charging member according to Japanese Patent Application Publication No. 2002-3651, it is thought that a conductive path through which charge can be transported is formed from the outer surface of a support of the conductive member to the outer surface of the conductive member. Therefore, most charge accumulated in the conductive layer is discharged toward a component to be charged such as a photosensitive member and a toner in one discharge. Here, the outer surface of the conductive member is a surface of the conductive member in contact with the toner.

Here, the inventors measured and analyzed the discharge state of the charging member according to Japanese Patent Application Publication No. 2002-3651 in detail using an oscilloscope. As a result, in the charging member according to Japanese Patent Application Publication No. 2002-3651, it was confirmed that, as the process speed increased, there was a so-called discharge omission in which no discharging occurred at a timing at which discharging should inherently occur. The reason for discharge omission is thought to be that most charge accumulated in the conductive layer is consumed by discharging from the conductive member and then charge cannot be accumulated in the conductive layer in time for the next discharging.

Here, the inventors postulated that discharge omission could be eliminated when a large amount of charge can be accumulated in the conductive layer and the accumulated charge is not consumed at once in one discharge. They conducted further studies based on such considerations, and as a result, found that the conductive member having the configuration according to the present disclosure can satisfy the above requirements favorably.

In addition, in the toner according to the present disclosure, charge propagates through a domain Dc formed of a crystalline material and spreads over the entire toner, and the toner can accumulate a large amount of charge. In addition, due to uniform discharging without omission from the conductive member, it is possible to effectively discharge the toner and easily impart a negative charge.

As a result, an electrostatic repulsive force occurs between the conductive member and the toner. For the above reason, it is possible to prevent the toner from contaminating the conductive member.

Hereinafter, the conductive member and the toner will be described.

Conductive Member

A conductive member will be described mainly based on a form of a charging member.

A conductive member comprises a support having a conductive outer surface and a conductive layer provided on the outer surface of the support. The conductive layer has conductivity. Here, the conductivity is defined as a volume resistivity of less than $1.0 \times 10^8$ Ω·cm.

Thus, the conductive layer comprises a matrix containing a first rubber and a plurality of domains Dt dispersed in the matrix, and the each of domains Dt contain a second rubber and an electronic conductive agent.

Regarding the conductive member, a conductive member having a roller shape (hereinafter referred to as a "conductive roller") will be exemplified with reference to FIG. 1. FIG. 1 is a cross-sectional view perpendicular to a direction (hereinafter referred to as a "longitudinal direction") along the axis of the conductive roller. A conductive roller 51 comprises a cylindrical conductive support 52 and a conductive layer 53 formed on the outer circumference of the support 52, that is, the outer surface of the support.

Support

The material constituting the support may be selected, as appropriate, from materials known in the field of conductive members for electrophotography and materials that can be used as conductive members. Examples thereof include synthetic resin having conductivity and metals and alloys such as aluminum, stainless steel, iron, copper alloy, and the like.

Furthermore, these may be subjected to oxidation or plating with chromium, nickel, or the like. Either electroplating or electroless plating can be used as the type of plating. From the viewpoint of dimensional stability, electroless plating is preferable. Examples of the electroless plating used here include nickel plating, copper plating, gold plating, and various types of alloy plating.

The thickness of the plated layer is preferably 0.05 μm or more, and considering the balance between work efficiency and rust prevention ability, the thickness of the plated layer is preferably from 0.10 μm to 30.00 μm. The cylindrical shape of the support may be a solid cylindrical shape or a hollow cylindrical shape (round tubular shape). The outer diameter of this support is preferably in the range of from 3 mm to 10 mm.

Where a medium-resistance layer or an insulating layer is present between the support and the conductive layer, it may not be possible to quickly supply the charge after the charge has been consumed by the discharge. Therefore, the conductive layer may be provided directly on the support, or the conductive layer may be provided on the outer periphery of the support only with an intermediate layer composed of a thin film and a conductive resin layer such as a primer interposed therebetween.

As the primer, known materials can be selected and used according to the rubber material for forming the conductive layer and the material of the support. The material of the primer can be exemplified by a thermosetting resin and a thermoplastic resin. Specifically, known materials such as phenolic resins, urethane resins, acrylic resins, polyester resins, polyether resins, and epoxy resins can be used.

Conductive Layer

It is thought that, in the conductive layer when a charging bias is applied between the support of the conductive member and the electrophotographic photosensitive member, charge moves from the side of the support of the conductive layer to the opposite side, that is, the side of the outer surface of the conductive member, as follows. That is, charge is accumulated near an interface between the matrix and the domain.

Then, the charge is sequentially transferred from the domain positioned on the side of the conductive support to the domain positioned on the side opposite to the side of the conductive support, and reaches the surface (hereinafter referred to as "the outer surface of the conductive layer") on the side opposite to the conductive support of the conductive layer. In this case, when charge of all domains moves toward the side of the outer surface of the conductive layer in one charging step, it takes time to accumulate charge in the conductive layer for the next charging step. Then, it is difficult to achieve stable discharging in a high-speed electrophotographic image forming process.

Therefore, even if a charging bias is applied, it is preferable that transfer of charge between domains do not occur simultaneously. In addition, since movement of charge is restricted in the high-speed electrophotographic image forming process, in order to discharge a sufficient amount of charge in one discharge, it is preferable to accumulate a sufficient amount of charge in each domain.

The conductive layer includes a matrix and a plurality of domains Dt dispersed in the matrix. Then, the matrix contains a first rubber and the each of domains Dt contain a second rubber and an electronic conductive agent. Thus, the matrix and the domain Dt have the following technical features (i) and (ii). Technical feature (i): The matrix has a volume resistivity R1 of larger than $1.00 \times 10^{12}$ Ω·cm.

Technical feature (ii): The domain Dt has a volume resistivity R2 of smaller than the volume resistivity R1 of the matrix.

The conductive member including the conductive layer having the technical features (i) and (ii) can accumulate sufficient charge in each domain Dt when a bias is applied between it and the photosensitive member. In addition, since the domains Dt are divided by the electrically insulating matrix, it is possible to reduce simultaneous transfer of charge between the domains Dt. Accordingly, it is possible to prevent most charge accumulated in the conductive layer from being discharged in one discharge.

As a result, immediately after one discharging is completed, charges for the next discharging is still accumulated in the conductive layer. Therefore, it is possible to perform stable discharging in a short cycle time. Hereinafter, such discharging achieved by the conductive member according to the present disclosure will be referred to as "fine discharging."

As described above, the conductive layer having a matrix domain structure including the technical features (i) and (ii) can reduce simultaneous transfer of charge between the domain when a bias is applied and accumulate sufficient charge in the domain. Therefore, the conductive member can continuously and stably impart charge to a component to be charged even if it is applied to an electrophotographic image forming device at a high process speed.

Technical feature (i); Volume Resistivity of Matrix

When the matrix has the volume resistivity R1 of larger than $1.00 \times 10^{12}$ Ω·cm, it is possible to reduce movement of charge in the matrix by bypassing the domain Dt. Thus, it is possible to reduce consumption of most charge accumulated in one discharge. In addition, it is possible to prevent charge accumulated in the domain Dt from leaking to the matrix, as if a conductive path that communicates with the conductive layer were formed.

The volume resistivity R1 is preferably at least $2.00 \times 10^{12}$ Ω·cm. On the other hand, the upper limit of R1 is not particularly limited, and as a guide, is preferably not more than $1.00 \times 10^{17}$ Ω·cm, and more preferably not more than $8.00 \times 10^{16}$ Ω·cm.

The inventors thought that a configuration in which a region (domain Dt) in which sufficient charge is accumulated is divided by an electrically insulating region (matrix) would be effective in order to move charge through the domain Dt in the conductive layer and achieve fine discharging. Thus, when the volume resistivity of the matrix is set within a range of a high resistance region as described above, it is possible to retain sufficient charge at an interface with each domain Dt, and it is possible to reduce leakage charge from the domain Dt.

In addition, in order to achieve fine discharging and a necessary and sufficient discharge amount, it is extremely effective to limit a charge movement path to the path via the domain Dt. When leakage of charge from the domain Dt to the matrix is reduced and a charge transport path is limited to a path via the plurality of domains, since it is possible to improve the density of charge in the domain Dt, it is possible to further increase an amount of charge filled in each domain.

Accordingly, it is thought that, on the surface of the domain Dt as a conductive phase which is the starting point of discharging, it is possible to improve a total number of charge that can participate in discharging, and as a result, it is possible to improve ease of discharging from the surface of the conductive member.

Method of measuring volume resistivity of matrix

The volume resistivity of the matrix can be measured using a micro probe after the conductive layer is thinned Regarding a means for thinning, a means such as a microtome that allows a very thin sample to be produced is used. A specific procedure will be described below.

Technical feature (ii); Volume Resistivity of Domain Dt

The domain Dt has a volume resistivity R2 of smaller than the volume resistivity R1 of the matrix. Accordingly, unintended movement of charge in the matrix is reduced, and the charge transport path is easily limited to the path via the plurality of domains Dt.

In addition, the volume resistivity R1 is preferably at least $1.0 \times 10^5$ times the volume resistivity R2. R1 is more preferably $1.0 \times 10^5$ to $1.0 \times 10^{20}$ times R2, still more preferably $1.0 \times 10^6$ to $1.0 \times 10^{18}$ times the volume resistivity R2, and yet more preferably $1.0 \times 10^9$ to $1.0 \times 10^{16}$ times the volume resistivity R2.

In addition, R2 is preferably from $1.00 \times 10^1$ Ω·cm to $1.00 \times 10^6$ Ω·cm. When the volume resistivity of the domain Dt is set within the above range, it is possible to dramatically improve an amount of charge that moves in the domain Dt. R2 is more preferably from $1.00 \times 10^1$ Ω·cm to $1.00 \times 10^4$ Ω·cm. Within the above range, the charge transport path can be additionally limited to a path via the domain Dt.

The volume resistivity of the domain Dt is adjusted, for example, by changing the type and amount of the electronic conductive agent with respect to the rubber component of the domain Dt, and setting the conductivity to a predetermined value.

Regarding the rubber material for the domain Dt, a rubber composition containing a rubber component for the matrix can be used. In order to form a matrix domain structure, a difference between solubility parameters (SP values) of rubber materials forming the matrix is preferably within a certain range. That is, the absolute value of the difference between the SP value of the first rubber and the SP value of the second rubber is preferably from 0.4 $(J/cm^3)^{0.5}$ to 5.0 $(J/cm^3)^{0.5}$, and more preferably from 0.4 $(J/cm^3)^{0.5}$ to 2.2 $(J/cm^3)^{0.5}$.

The volume resistivity of the domain Dt can be adjusted by appropriately selecting the type of the electronic conductive agent and the amount added. Regarding the electronic conductive agent that is used for controlling the volume resistivity of the domain Dt such that it is from $1.00 \times 10^1$ $\Omega \cdot cm$ to $1.00 \times 10^4$ $\Omega \cdot cm$, an electronic conductive agent that allows the volume resistivity to change greatly from a high resistance to a low resistance depending on the amount of dispersion is preferable.

Examples of the electronic conductive agent to be blended in the domains Dt include carbon black, graphite, oxides such as titanium oxide, and tin oxide, metals such as Cu and Ag, particles coated with an oxide or a metal to make them electrically conductive, and the like. Further, if necessary, two or more kinds of these conductive agents may be blended and used in an appropriate amount.

Among the above electronic conductive agents, it is preferable to use conductive carbon black, which has a large affinity with rubber and makes it possible to control easily the distance between the electronic conductive agents. The type of carbon black to be blended in the domains is not particularly limited. Specific examples thereof include gas furnace black, oil furnace black, thermal black, lamp black, acetylene black, Ketjen black, and the like.

Among them, conductive carbon black having a DBP oil absorption amount from 40 $cm^3/100$ g to 170 $cm^3/100$ g, which can impart high conductivity to the domains Dt, can be preferably used.

The amount of the electronic conductive agent such as conductive carbon black is preferably from 20 parts by mass to 150 parts by mass, and more preferably from 50 parts by mass to 100 parts by mass with respect to 100 parts by mass of the second rubber contained in the domains Dt.

It is preferable that the electronic conductive agent be blended in an amount larger than that in the conductive member for general electrophotography. As a result, the volume resistivity of the domains can be easily controlled within the range from $1.00 \times 10^1$ $\Omega \cdot cm$ to $1.00 \times 10^6$ $\Omega \cdot cm$.

Further, if necessary, a filler, a processing aid, a crosslinking aid, a crosslinking accelerator, an antiaging agent, a crosslinking accelerator, a crosslinking retarder, a softener, a dispersant, a colorant, and the like which are generally used as compounding agents for rubber may be added to the rubber composition for domains Dt within a range that does not impair the effects according to the present disclosure.

Measurement of Volume Resistivity R2 of Domains Dt;

The volume resistivity R2 of the domains Dt may be measured by the same method as that suitable for measuring the volume resistivity R1 of the matrix, except that the measurement site is changed to a place corresponding to the domain and the applied voltage at the time of measuring the current value is changed to 1 V. The specific procedure will be described hereinbelow.

Technical feature (iii); Distance between Adjacent Wall Surfaces of Domain Dt

When charge is transferred between the domains Dt, in observation of the cross section of the conductive layer in the thickness direction, the arithmetic average value Dm of distances between adjacent wall surfaces of the domain Dt (hereinafter simply referred to as a "distance Dm between the domains") is preferably not more than 2.00 µm, and more preferably not more than 1.00 µm.

In addition, since the domains Dt can be electrically reliably separated from each other in the insulating region (matrix), and charge can be more easily accumulated in the domains Dt, the distance Dm between the domains is preferably at least 0.15 µm, and more preferably at least 0.20 µm.

Method of Measuring Distance Dm between Domains

A method of measuring a distance Dm between the domains may be performed as follows.

First, a section is produced by the same method as the above method of measuring the volume resistivity of the matrix. In addition, in order to suitably observe the matrix domain structure, a pretreatment such as a dyeing treatment and a vapor deposition treatment in which a contrast between a conductive phase and an insulation phase is suitably obtained may be performed.

A section on which a fracture surface is formed and platinum is deposited is observed using a scanning electron microscope (SEM) and it is checked whether there is a matrix domain structure. In particular, in consideration of accuracy in quantifying the area of the domain, it is preferable to perform observation at a magnification of 5,000 using the SEM. A specific procedure will be described below.

Uniformity of Distance Dm between Domains

It is preferable that there is a uniform distribution of the distance Dm between the domains in order that fine discharging can be formed more stably. When the distribution of the distance Dm between the domains is uniform, a part in which the distance between domains is locally long in the conductive layer can be formed, and thus it is possible to inhibit a phenomenon in which ease of discharging is reduced, for example, the occurrence of a part in which supply of charge is delayed compared to the surroundings.

Figure 3A:
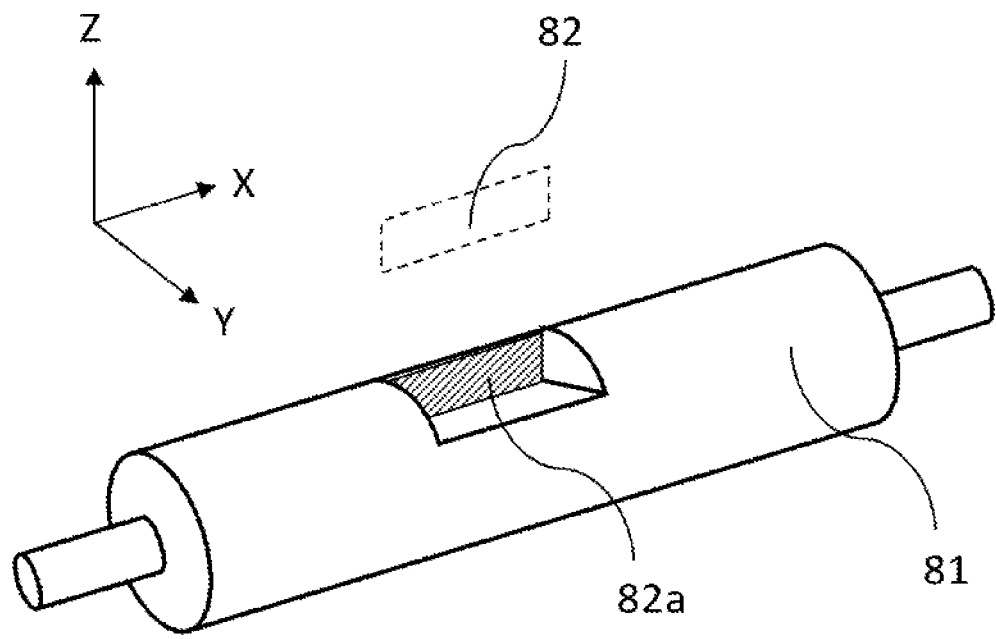
FIGS. 3A and 3B show illustrative diagrams of a cross section in directions cut from the conductive layer of the charging roller.
Figure 3B:
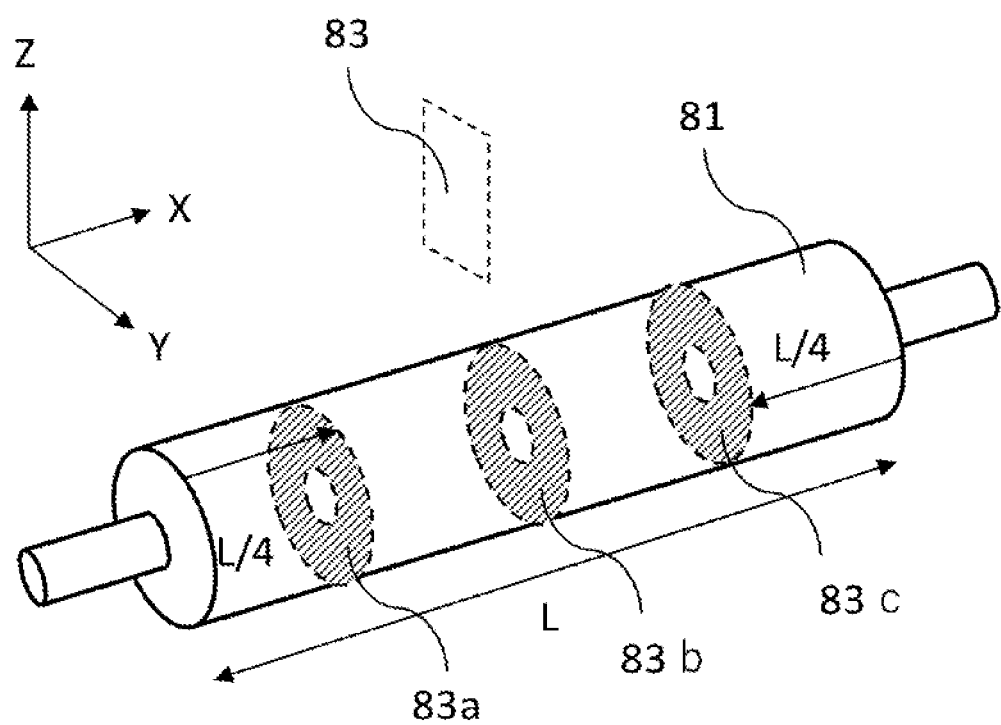

In the cross section in which charge is transported, that is, in the cross section of the conductive layer in the thickness direction shown in FIG. 3B, an observation region of 50 µm square is acquired at three arbitrary points in the thickness region from the outer surface of the conductive layer to a depth of 0.1 T to 0.9 T in the support direction. In this case, using a distance Dm between the domains in the observation region and a standard deviation σm of the distribution of the distance between the domains, the coefficient of variation σm/Dm of the distance between the domains is preferably from 0 to 0.40 and more preferably from 0.10 to 0.30.

Method of Measuring Uniformity of Distance Dm between Domains

As in measurement of a distance between the domains, the uniformity of a distance between the domains can be measured by quantifying images obtained by direct observation of the fracture surface. A specific procedure will be described below.

Technical feature (iv); Height of Protrusion of Domain Dt

The domain Dt is exposed to the outer surface of the conductive member. The outer surface of the conductive member is composed of at least a matrix and the domain Dt exposed to the outer surface of the conductive member. The outer surface of the conductive member preferably has a protruding portion of the domain Dt.

According to fine discharging generated by the conductive member, negative charge can be effectively imparted to the toner. In addition, when the domain Dt is exposed to the outer surface of the conductive member and a protruding portion is formed, it preferentially comes in contact with the toner that has reached the region in contact with the photosensitive drum on the surface of the conductive member. As a result, it is possible to suitably inject negative charge into the toner and it is possible to further reduce adhesion of the toner to the conductive member.

The average value of the heights of the protruding portions formed by the domains Dt is preferably from 50 nm to 250 nm, and more preferably from 100 nm to 200 nm. When the height is set to 50 nm or more, it is possible to increase the chance of contact with the toner, and it is possible to impart a sufficient injection charge to the toner. On the other hand, when the height is set to not more than 250 nm, it is possible to reduce the occurrence of non-uniform discharging due to the protruding portion.

Method of Confirming Convex Shape Derived from Domain Dt

When a thin piece including the surface is removed from the conductive layer, the convex shape derived from the domain Dt can be confirmed and the convex shape can be measured with a micro probe. A surface profile and an electrical resistance profile of the thin piece sampled from the conductive member are measured using an SPM. Accordingly, it can be confirmed that the protruding portion is a protrusion derived from the domain. At the same time, it is possible to quantify and evaluate the height of the protruding portion from the shape profile. A specific procedure will be described below.

Method of Forming Convex Shape Derived from Domain Dt

A method of forming a convex shape derived from the domain Dt is not particularly limited. For example, a convex shape can be obtained by grinding the surface of the conductive member. In addition, the inventors conceived that a conductive layer having a matrix domain structure could be suitably formed in a grinding step using a grindstone. Specifically, it is preferable to perform formation using a grinding method in a plunge type polishing machine using a sand grindstone.

A mechanism in which the convex shape derived from the domain Dt is formed by grindstone polishing is inferred to be as follows. First, the domain Dt dispersed in the matrix is filled with an electronic conductive agent, and has stronger reinforcing properties than a matrix not filed with the electronic conductive agent. Therefore, it is possible to form the convex shape derived from the domain Dt using a difference in grindability caused by the difference in the reinforcing property.

Specifically, when a grinding process is performed using the same grindstone, the domain Dt is less likely to be ground than the matrix because it has a strong reinforcing property. Therefore, it is thought that the protruding portion derived from the domain Dt is formed.

Here, a plunge type polishing machine using a sand grindstone will be described. The roughness of the surface of the sand grindstone can be appropriately selected according to the polishing efficiency and the type of the constituent material of the rubber elastic layer. The roughness of the grindstone surface can be adjusted by the type, the particle size, the degree of bonding, the linker, the structure (grain percentage) of abrasive grains, and the like.

Here, the "particle size of abrasive grains" indicates the size of abrasive grains, and is expressed as, for example, #80. The number in this case means how many openings there are per inch (25.4 mm) of the mesh for selecting abrasive grains, and a larger number indicates a finer abrasive grain.

The "degree of bonding of abrasive grains" indicates the hardness and is represented by letters A to Z. The nearer the letter is to A, the weaker the degree of bonding, and the nearer the letter is to Z, the stronger the degree of bonding. When a larger amount of linker is contained in the abrasive grains, the grindstone has a harder degree of bonding.

The "structure (grain percentage) of abrasive grains" represents a volume proportion of abrasive grains in a total volume of the grindstone, and the size of the structure represents the density of the structure. A larger number indicating the structure represents a coarser texture. A grindstone having a large structure number and large holes is called a porous grindstone and has advantages such as preventing clogging and burning of the grindstone.

Generally, the sand grindstone can be produced by mixing raw materials (an abrasive material, a linker, a pore agent, etc.), and performing press molding, drying, firing, and finishing. Regarding the abrasive grains, green silicon carbide (GC), black silicon carbide (C), white alumina (WA), brown alumina (A), zirconia alumina (Z), or the like can be used. These materials can be used alone or a plurality thereof can be used in combination.

In addition, regarding the linker, vitrified (V), resinoid (B), resinoid reinforcement (BF), rubber (R), silicate (S), magnesia (Mg), shellac (E) and the like can be appropriately used depending on applications.

Here, regarding the shape of the outer diameter of the sand grindstone in the longitudinal direction, an inverted crown shape of which the outer diameter gradually decreases from the end to the center is preferable so that the conductive member (charging roller) can be polished into a crown shape. The shape of the outer diameter of the sand grindstone is preferably a shape of an arc curve or a at least quadratic order curve with respect to the longitudinal direction.

In addition to this, the shape of the outer diameter of the sand grindstone may be a shape represented by various formulae such as a fourth-order curve or a sine function. The shape of the external form of the sand grindstone is preferably such that the change in the outer diameter changes smoothly, but a shape of an arc curve or the like may be approximated to a polygonal shape with a straight line. The width of the sand grindstone in a direction corresponding to the axial direction is preferably equal to or larger than the width of the conductive member in the axial direction.

A grindstone is appropriately selected in consideration of factors listed above, a grinding step is performed under conditions in which the difference in grindability between the domain Dt and the matrix increases, and thus a convex shape derived from the domain Dt can be formed.

Specifically, conditions in which polishing is minimized and conditions in which abrasive grains with poor sharpness are used are preferably used. For example, a means such as polishing using a treated grindstone (abrasive grains can be worn away by polishing the surface of the grindstone dressed with a rubber member containing abrasive grains; the grindstone treated with a rubber member) can be used such that a time for a precision polishing step after rough cutting is shortened.

The conductive member may be formed, for example, by a method including the following steps (i) to (iv).

Step (i): a step of preparing a domain Dt-forming rubber mixture (hereinafter, also referred to as "CMB") including a carbon black and the second rubber.

Step (ii): a step of preparing a matrix-forming rubber mixture (hereinafter also referred to as "MRC") including the first rubber.

Step (iii): a step of kneading CMB and MRC to prepare a rubber mixture having a matrix domain structure.

Step (iv): a step of forming a layer of the rubber mixture prepared in step (iii) on a conductive support directly or with another layer interposed therebetween, and curing the layer of the rubber composition is cured to form a conductive layer.

The technical features (i) to (iii) can be controlled, for example, by selecting the materials to be used in each of the above steps and adjusting the production conditions. This will be described hereinbelow.

Regarding the technical feature (i), the volume resistivity of the matrix is determined by the composition of MRC.

A rubber having low conductivity is preferable as the first rubber used for MRC. Such rubber may be at least one rubber selected from the group consisting of natural rubber, butadiene rubber, butyl rubber, acrylonitrile butadiene rubber, urethane rubber, silicone rubber, fluororubber, isoprene rubber, chloroprene rubber, styrene butadiene rubber, ethylene propylene rubber, ethylene propylene diene rubber, and polynorbornene rubber.

The first rubber is more preferably at least one selected from the group consisting of butyl rubber, styrene butadiene rubber, and ethylene propylene diene rubber.

Further, provided that the volume resistivity of the matrix is within the above range, a filler, a processing aid, a crosslinking agent, a crosslinking aid, a crosslinking accelerator, a crosslinking enhancing agent, a crosslinking retarder, an antiaging agent, a softening agent, a dispersant, a coloring agent and the like may be added, as necessary to the MRC. Meanwhile, it is preferable that the MRC does not contain an electronic conductive agent such as carbon black in order to keep the volume resistivity of the matrix within the above range.

Further, regarding the technical feature (ii), the volume resistivity R2 can be adjusted by the amount of the electronic conductive agent in the CMB. For example, where the conductive carbon black having a DBP oil absorption from 40 cm$^3$/100 g to 170 cm$^3$/100 g is used as the electronic conductive agent, the technical feature (ii) can be achieved by preparing the CMB so as to include the conductive carbon black in an amount of from 40 parts by mass to 200 parts by mass of with respect to 100 parts by mass of the second rubber.

Furthermore, regarding the distributed state of domains Dt related to the technical feature (iii), it is effective to control the following four parameters (a) to (d).

(a) Difference in interfacial tension a between CMB and MRC.

(b) Ratio ($\eta m/\eta d$) of MRC viscosity ($\eta m$) and CMB viscosity ($\eta d$).

(c) Shear rate ($\gamma$) during kneading of CMB and MRC and energy amount (EDK) during shearing in step (iii).

(d) Volume fraction of CMB with respect to MRC in step (iii).

(a) Difference in Interfacial Tension between CMB and MRC

Generally, when two types of incompatible rubbers are mixed, phase separation occurs. This is because the interaction between the same polymers is stronger than the interaction between the different polymers, so that the same polymers agglomerate to reduce the free energy and cause stabilization.

Since the interface of the phase-separated structure comes into contact with different polymers, the free energy becomes higher than that on the inside which is stabilized by the interaction of the same molecules. As a result, in order to reduce the free energy of the interface, interfacial tension aimed at the reduction in area of contact with the different polymer is generated. When the interfacial tension is small, even different polymers tend to be mixed more uniformly in order to increase entropy. The state of being uniformly mixed is dissolution, and the SP value (solubility parameter), which is a measure of solubility, and the interfacial tension tend to be correlated.

That is, it is considered that the difference in interfacial tension between CMB and MRC correlates with the difference in SP value between the rubbers contained therein. The difference between the absolute values of solubility parameter, SP value, of the first rubber in MRC and solubility parameter, SP value, of the second rubber in CMB is preferably from 0.4 (J/cm$^3$)$^{0.5}$ to 5.0 (J/cm$^3$)$^{0.5}$. More preferably, rubbers may be selected such that the difference is from 0.4 (J/cm$^3$)$^{0.5}$ to 2.2 (J/cm$^3$)$^{0.5}$. Within this range, a stable phase separation structure can be formed, and the domain diameter of CMB can be reduced.

Here, the second rubber that can be used for CMB can be specifically and preferably exemplified by at least one rubber selected from the group consisting of natural rubber (NR), isoprene rubber (IR), butadiene rubber (BR), acrylonitrile butadiene rubber (NBR), styrene butadiene rubber (SBR), butyl rubber (IIR), ethylene propylene rubber (EPM), ethylene propylene diene rubber (EPDM), chloroprene rubber (CR), nitrile rubber (NBR), hydrogenated nitrile rubber (H-NBR), silicone rubber, and urethane rubber (U).

The second rubber is more preferably at least one selected from the group consisting of styrene butadiene rubber (SBR), butyl rubber (IIR), and acrylonitrile butadiene rubber (NBR), and further preferably at least one selected from the group consisting of styrene butadiene rubber (SBR) and butyl rubber (IIR).

The thickness of the conductive layer is not particularly limited as long as the intended function and effect of the conductive member can be obtained. The thickness of the conductive layer is preferably from 1.0 mm to 4.5 mm.

The mass ratio of domains Dt to matrix (domain Dt:matrix) is preferably from 5:95 to 40:60, more preferably from 10:90 to 30:70, and further preferably from 13:87 to 25:75.

Method for Measuring SP Value

The SP value can be calculated accurately by creating a calibration curve using a material with a known SP value. As the known SP value, the catalog value of the material manufacturer can be used. For example, the SP value of NBR and SBR does not depend on the molecular weight, and is substantially determined by the content ratio of acrylonitrile and styrene.

Therefore, by analyzing the content ratio of acrylonitrile or styrene in the rubbers constituting the matrix and domains Dt by using an analysis method such as pyrolysis gas chromatography (Py-GC) and solid-state NMR, it is possible to calculate the SP value calibration curve obtained from a material having a known SP value.

The SP value of isoprene rubber is determined by an isomer structure of 1,2-polyisoprene, 1,3-polyisoprene, 3,4-polyisoprene, cis-1,4-polyisoprene, trans-1,4-polyisoprene, and the like. Therefore, similarly to SBR and NBR, it is possible to analyze the isomer content ratio by Py-GC, solid-state NMR, and the like, and the SP value can be calculated from a material having a known SP value.

The SP value of a material with a known SP value is obtained by a Hansen sphere method.

(b) Viscosity Ratio of CMB and MRC

The closer the viscosity ratio (CMB/MRC) ($\eta d/\eta m$) of CMB and MRC to 1, the smaller the domain diameters can be made. Specifically, the viscosity ratio is preferably from 1.0 to 2.0. The viscosity ratio of CMB and MRC can be adjusted by selecting the Mooney viscosity of the raw material rubbers used for CMB and MRC, and by changing the type and amount of the filler to be blended.

It is also possible to add a plasticizer such as paraffin oil to the extent that the formation of a phase-separated structure is not impaired.

Further, the viscosity ratio can be adjusted by adjusting the temperature during kneading. The viscosity of the rubber mixture for forming the domains and the rubber mixture for forming the matrix can be obtained by measuring the Mooney viscosity $ML_{(1+4)}$ at the rubber temperature during kneading on the basis of JIS K 6300-1:2013.

(c) Shear Rate During Kneading of MRC and CMB, and Energy Amount During Shear

The interdomain distances Dm and Dms can be made smaller as the shear rate during kneading of MRC and CMB is higher and the energy amount at the time of shear is larger.

The shear rate can be increased by increasing the inner diameter of a stirring member such as a blade or screw of a kneading machine, decreasing a gap between the end surface of the stirring member and the inner wall of the kneading machine, or increasing the rotation speed. Further, the energy at the time of shearing can be increased by increasing the rotation speed of the stirring member or by increasing the viscosities of the first rubber in the CMB and the second rubber in the MRC.

(d) Volume Fraction of CMB with Respect to MRC

The volume fraction of CMB with respect to MRC correlates with the collision coalescence probability of the domain Dt-forming rubber mixture with respect to the matrix-forming rubber mixture. Specifically, when the volume fraction of the domain Dt-forming rubber mixture with respect to the matrix-forming rubber mixture is reduced, the collision and coalescence probability of the domain Dt-forming rubber mixture and the matrix-forming rubber mixture decreases. That is, the interdomain distances Dm and Dms can be reduced by reducing the volume fraction of the domains Dt in the matrix within a range where the required conductivity can be obtained.

The volume fraction of the CMB with respect to the MRC (that is, the volume fraction of the domains Dt with respect to the matrix) is preferably from 15% to 40%.

In addition, in the conductive member, when the length of the conductive layer in the longitudinal direction is set as L and the thickness of the conductive layer is set as T, at three points including the center of the conductive layer in the longitudinal direction and points of L/4 from both ends to the center of the conductive layer, cross sections of the conductive layer in the thickness direction as shown in FIG. 3B are acquired. It is preferable to satisfy the following for each of the cross sections of the conductive layer in the thickness direction.

In each of the cross sections, when an observation region of 15 µm square is provided at three arbitrary points in the thickness region from the outer surface of the conductive layer to a depth of 0.1 T to 0.9 T, at least 80 number % of the domains Dt observed in each of all of the nine observation regions preferably have the following technical features (v) and (vi).

Technical feature (v)

A proportion µr of the cross-sectional area of the electronic conductive agent contained in the domain Dt in the cross-sectional area of the domain Dt is at least 20%

Technical feature (vi)

When the perimeter of the domain Dt is set as A, and the envelope perimeter of the domain Dt is set as B, A/B is from 1.00 to 1.10

The component (v) and the component (vi) can be said to be definitions regarding the shape of the domain Dt. The "shape of the domain Dt" is defined as the shape of the cross section of the domain Dt that appears in the cross section of the conductive layer in the thickness direction.

The shape of the domain Dt is preferably a shape having no unevenness on its peripheral surface, that is, a shape close to a sphere. When the number of uneven structures regarding the shape is reduced, it is possible to reduce non-uniformity of the electric field between the domains Dt, that is, reduce the number of parts in which the electric field is concentrated, and reduce a phenomenon in which unnecessary charge transport occurs in the matrix.

The inventors have found that the amount of the electronic conductive agent contained in one domain Dt affects the shape of the external form of the domain Dt. That is, they found that the shape of the external form of the domain Dt becomes closer to a sphere as the amount of the electronic conductive agent filled into one domain Dt increases. When the number of domains Dt closer to a sphere increases, it is possible to reduce the number of concentration points of electron transfer between the domains Dt.

Thus, according to studies performed by the inventors, based on the area of the cross section of one domain Dt, a domain Dt in which a proportion µr of a total cross-sectional area of the electronic conductive agent observed in the cross section is at least 20% can have a shape closer to a sphere.

As a result, this is preferable for obtaining a shape of an external form that can significantly alleviate concentration of electron transfer between the domains Dt. Specifically, the proportion µr of the cross-sectional area of the electronic conductive agent contained in the domain Dt with respect to the cross-sectional area of the domain Dt is preferably at least 20%, and more preferably 25% to 30%.

Within the above range, it is possible to provide a sufficient charge supply amount even in a high-speed process.

The inventors have found that it is preferable for the shape of the peripheral surface of the domain Dt having no unevenness to satisfy the following Formula (5).

$$1.00 \leq A/B \leq 1.10 \quad (5)$$

(A: perimeter of domain Dt, B: envelope perimeter of domain Dt)

Figure 6:
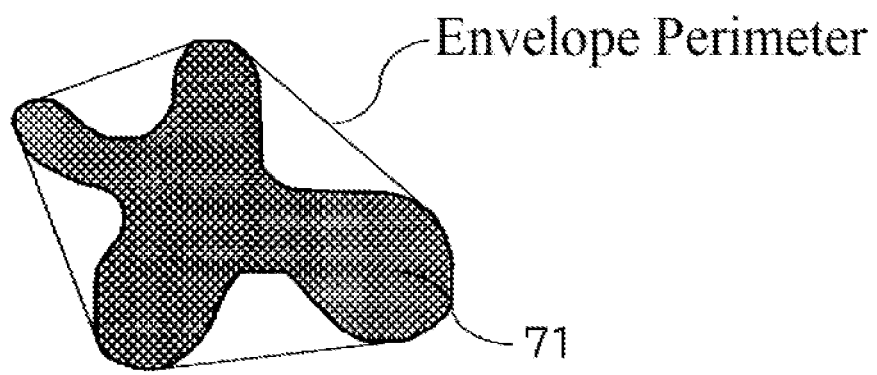
FIG. 6 is an illustrative diagram of an envelope perimeter of a domain.

Formula (5) shows the ratio of the perimeter A of the domain Dt to the envelope perimeter B of the domain Dt. Here, as shown in FIG. 6, the envelope perimeter is a perimeter when protruding portions of a domain 71 observed in the observation region are connected.

The ratio of the perimeter of the domain Dt to the envelope perimeter of the domain Dt has a minimum value of 1, and when the ratio is 1, this indicates that the domain Dt has a shape such as a perfect circle or an ellipse in which there is no depressed portion in the shape of the cross section. When such a ratio is not more than 1.1, this indicates that the domain Dt does not have a large uneven shape and anisotropy of the electric field is unlikely to appear.

Method of Measuring Parameters regarding Shape of Domain Dt

An ultrathin section with a thickness of 1 µm is cut out from the conductive layer of the conductive member (conductive roller) at a cutting temperature of −100° C. using a microtome (product name: Leica EM FCS, commercially available from Leica Microsystems). However, as will be described below, it is necessary to produce a section according to the cross section perpendicular to the longitudinal direction of the conductive member and evaluate the shape of the domain Dt on the fracture surface of the section. The reason for this will be described below.

FIGS. 3A and 3B are diagrams showing the shape of a conductive member 81 with three axes, specifically, three dimensions with X, Y, and Z axes. In FIGS. 3A and 3B, the X axis represents a direction parallel to the longitudinal direction (axial direction) of the conductive member, and the Y axis and the Z axis represent directions perpendicular to the axial direction of the conductive member.

FIG. 3A shows an image view of the conductive member in which the conductive member is cut out at a cross section 82a parallel to an XZ plane 82. The XZ plane can rotate 360° about the axis of the conductive member. In consideration of the conductive member that is in contact with the photosensitive drum and rotates, and allows discharging when it passes through a gap between it and the photosensitive drum, the cross section 82a parallel to the XZ plane 82 indicates a surface in which discharging occurs simultaneously at a certain timing. The surface potential of the photosensitive drum is formed when the surface corresponding to a certain amount of the cross section 82a is passed.

Therefore, in order to evaluate the shape of the domain Dt, which correlates with the electric field concentration in the conductive member, instead of analysis of a cross section such as the cross section 82a in which discharging simultaneously occurs in a moment, it is necessary to perform evaluation in a cross section parallel to a YZ plane 83 perpendicular to the axial direction of the conductive member in which it is possible to evaluate the shape of the domain including a certain amount of the cross section 82a.

In the evaluation, when the length of the conductive layer in the longitudinal direction is set as L, a total of three points including a cross section 83b at the center of the conductive layer in the longitudinal direction and two cross sections 83a and 83c at points of L/4 from both ends to the center of the conductive layer are selected.

In addition, regarding observation positions of the cross sections 83a to 83c, when the thickness of the conductive layer is set as T, measurement may be performed in a total of nine observation regions when an observation region of 15 µm square is provided at three arbitrary points in the thickness region from the outer surface of each of the sections to a depth from 0.1 T to 0.9 T.

Platinum is deposited on the obtained section to obtain a deposition section. Next, the surface of the deposition section is imaged using a scanning electron microscope (SEM) (product name: S-4800, commercially available from Hitachi High-Technologies Corporation) at a magnification of 1,000 or 5,000 to obtain an observation image.

Next, in order to quantify the shape of the domain Dt in the analysis image, image processing software (product name: ImageProPlus; commercially available from Media Cybernetics, Inc.) is used to perform 8-bit grayscale conversion and a 256-level monochrome image is obtained. Next, black and white of the image are inverted so that the domain in the fracture surface becomes white and a binarized image is obtained.

Method of Measuring Proportion µr of Cross-sectional Area of Electronic Conductive Agent in Domain Dt The proportion of the cross-sectional area of the electronic conductive agent in the domain Dt can be measured by quantifying the binarized image of the observation image imaged at a magnification of 5,000.

8-bit grayscale conversion is performed using image processing software (product name: ImageProPlus; commercially available from Media Cybernetics, Inc.), and a 256-level monochrome image is obtained. The observation image is binarized so that carbon black particles can be distinguished, and a binarized image is obtained. Using a count function for the obtained image, the cross-sectional area S of the domain Dt in the analysis image and a total cross-sectional area Sc of carbon black particles as the electronic conductive agent contained in the domain are calculated.

Then, regarding the proportion of the cross-sectional area of the electron conductive material in the domain Dt, an arithmetic average value µr of Sc/S at the above nine points is calculated.

The proportion µr of the cross-sectional area of the electronic conductive agent affects the uniformity of the volume resistivity of the domain Dt. In addition to the measurement of the proportion µr of the cross-sectional area, the uniformity of the volume resistivity of the domain Dt can be measured as follows.

According to the measurement method, regarding an index of the uniformity of the volume resistivity of the domain Dt, σr/µr is calculated from gr and a standard deviation σr of gr.

Method of Measuring Perimeter A and Envelope Perimeter B of Domain Dt

According to the count function in the image processing software, the following items are calculated for a group of domains present in the binarized image of the observation image imaged at a magnification of 1,000.
Perimeter A (µm)
Envelope perimeter B (µm)

These values are assigned to the following Formula (5) and an arithmetic average value of the evaluation image at nine points is used.

$$1.00 \le A/B \le 1.10 \quad (5)$$

(A: perimeter of domain Dt, B: envelope perimeter of domain Dt)

Method of Measuring Shape Index of Domain Dt

Regarding the shape index of the domain Dt, a number percent of the domain Dt group in which µr (area %) is at least 20% and the perimeter ratio A/B of the domain Dt satisfies Formula (5) with respect to a total number of domains may be calculated. The shape index of the domain Dt is preferably 80 number % to 100 number %.

For the binarized image, using a count function in image processing software (product name: ImageProPlus; commercially available from Media Cybernetics, Inc.), the number of domain Dt groups in the binarized image may be calculated and additionally, the number percent of the domains Dt that satisfy µr≥20 and Formula (5) may be determined.

As defined in the technical feature (vi), when the domain Dt is filled with the electronic conductive agent at a high density, it is possible to make the shape of the external form of the domain Dt close to a sphere, and as defined in the technical feature (v), it is possible to make the unevenness small.

Carbon black having a DBP oil absorption amount of from 40 cm³/100 g to 80 cm³/100 g can be preferably used as the electronic conductive agent in order to obtain domains Dt densely filled with the electronic conductive agent, as defined in the technical feature (vi).

The DBP oil absorption amount (cm³/100 g) is the volume of dibutyl phthalate (DBP) that can be absorbed by 100 g of carbon black, and this amount can be measured according to Japanese Industrial Standard (JIS) K 6217-4:2017 (Carbon Black for Rubber: Basic Characteristics—Part 4: Measurement of Oil Absorption Amount (Including Compressed Sample)).

Generally, carbon black has a tufted higher-order structure in which primary particles having an average particle diameter of from 10 nm to 50 nm are aggregated. This tufted higher-order structure is called a structure, and the degree thereof is quantified by the DBP oil absorption (cm³/100 g).

Since conductive carbon black having a DBP absorption within the above range has a less developed structural configuration, there is less carbon black aggregation and dispersibility in rubber is favorable. Therefore, the amount filled into the domain Dt can be increased, and as a result, it is easy to obtain the domain Dt whose shape of the external form is closer to a sphere.

In addition, since conductive carbon black having a DBP absorption within the above range is unlikely to form aggregates, it is easy to form the domain Dt according to the requirement (vii).

Domain Diameter D

An arithmetic average value of the circle-equivalent diameter D (hereinafter simply referred to as a "domain diameter D") of the domain Dt observed from the cross section of the conductive layer is preferably from 0.10 μm to 5.00 μm. Within this range, since the domain Dt of the outermost surface has the same size as that of the toner or less, fine discharging is possible and uniform discharging is easily achieved.

When the average value of the domain diameter D is set to at least 0.10 μm, it is possible to more effectively restrict a path through which charge moves to a desired path in the conductive layer. The value is more preferably at least 0.15 μm and still more preferably at least 0.20 μm.

In addition, when the average value of the domain diameter D is set to not more than 5.00 μm, it is possible to exponentially increase the proportion of the surface area to a total volume of the domain, that is, a specific surface area of the domain Dt, and it is possible to dramatically improve efficiency of emission of charge from the domain Dt. For the above reason, the average value of the domain diameter D is more preferably not more than 2.00 μm and still more preferably not more than 1.00 μm.

When the average value of the domain diameter D is set to not more than 2.00 μm, since it is possible to reduce electrical resistance of the domain Dt itself, the amount of a single discharge can be set to a necessary and sufficient amount and fine discharging can be performed more efficiently.

In addition, when the average value of the domain diameter D is set to not more than 2.00 μm, it is possible to reduce an impedance at $1.0 \times 10^{-2}$ Hz to $1.0 \times 10^{1}$ Hz to $1.0 \times 10^{7} \Omega$ or less. For the same reason, the domain size is more preferably 1.00 μm or less. It is possible to further reduce the impedance at $1.0 \times 10^{-2}$ Hz to $1.0 \times 10^{1}$ Hz to no more than $1.0 \times 10^{5} \Omega$.

In order to further reduce the concentration of electric field between the domains Dt, the outer shape of the domains may be brought closer to a sphere. For that purpose, the domain diameter D may be made smaller within the above range. As a method therefor, for example, in the step (iv), MRC and CMB are kneaded so that MRC and CMB are phase-separated. Then, a method for controlling the CMB domain diameter D to a smaller value in the step of preparing a rubber mixture in which CMB domains are formed in the MRC matrix can be used.

By reducing the CMB domain diameter D, the specific surface area of the CMB increases and the interface with the matrix increases, so that tension that tends to reduce the tension acts on the interface of the CMB domains. As a result, the external shape of the CMB domains is closer to that of a sphere.

Here, regarding the factors that determine the domain diameter in the matrix-domain structure formed when two incompatible polymers are melt-kneaded, a Taylor's equation (formula (6)), a Wu's empirical equation (formulas (7), (8)), and a Tokita's equation (formula (9)) are known.

Taylor's Equation $$D = [C \cdot \sigma / \eta m \cdot \gamma] \cdot f(\eta m / \eta d) \quad (6)$$

Wu's Empirical Equation $$\gamma \cdot D \cdot \eta m / \sigma = 4(\eta d / \eta m) 0.84 \cdot \eta d / \eta m > 1 \quad (7)$$

$$\gamma \cdot D \cdot \eta m / \sigma = 4(\eta d / \eta m) - 0.84 \cdot \eta d / \eta m < 1 \quad (8)$$

Tokita's Equation $$D = 12 \cdot P \cdot \sigma \cdot \varphi / (\pi \cdot \eta \cdot \gamma) \cdot (1 + 4 \cdot P \cdot \varphi \cdot EDK / (\pi \cdot \eta \cdot \gamma)) \quad (9)$$

In the formulas (6) to (9), D is the maximum Feret diameter of the CMB domains, C is a constant, a is the interfacial tension, $\eta m$ is the matrix viscosity, $\eta d$ is the domain viscosity, $\gamma$ is the shear rate, and $\eta$ is the viscosity of a mixed system, P is the collision coalescence probability, $\varphi$ is the domain phase volume, and EDK is the domain phase cutting energy.

Regarding the technical feature (iii), it is effective to reduce the domain diameter according to the formulas (6) to (9) in order to improve the uniformity of interdomain distance. Further, in the process in which the raw material rubber of the domains is split and the particle diameter thereof is gradually reduced in the step of kneading MRC and CMB, the interdomain distance changes depending on when the kneading step is stopped.

Therefore, the uniformity of the interdomain distance can be controlled by the kneading time in the kneading process and the kneading rotation speed that is an index of kneading intensity. The longer the kneading time and kneading rotation speed, the more uniform the interdomain distance can be.

Uniformity of Domain Diameter D

It is preferable that the domain diameter D be uniform, that is, the particle size distribution be narrow. When the distribution of the domain diameter D of the conductive layer through which charge passes is made uniform, it is possible to reduce the concentration of charge in the matrix domain structure and effectively improve ease of discharging over the entire surface of the conductive member.

In the cross section in which charge is transported, that is, in the cross section of the conductive layer in the thickness direction as shown in FIG. 3B, when an observation region of 50 μm square is acquired at three arbitrary points in the thickness region from the outer surface of the conductive layer to a depth of 0.1 T to 0.9 T in the support direction, a ratio σd/D of the standard deviation σd of the domain diameter D to the arithmetic average value D of the domain diameter (coefficient of variation σd/D) is preferably from 0 to 0.40 and more preferably from 0.10 to 0.30.

In order to improve the uniformity of the domain diameter, as in the above method of improving the uniformity of the distance between domains, the domain diameter is reduced according to Formulae (6) to (9), and thus the uniformity of the domain diameter is also improved. In addition, in a step of kneading an MRC and a CMB, in a process in which raw material rubber of the domain is divided, and the particle diameter gradually decreases, the uniformity of the domain diameter varies depending on where the kneading step is stopped.

Therefore, the uniformity of the domain diameter can be controlled according to a kneading time in the kneading step and a kneading rotational speed as an index of the strength of the kneading, and when the kneading time is longer and the kneading rotational speed increases, it is possible to improve the uniformity of the domain diameter.

Method of Measuring Uniformity of Domain Diameter

The uniformity of the domain diameter can be measured by quantifying the image obtained by directly observing the fracture surface, which is obtained by the same method of measuring the uniformity of the distance between domains described above. A specific means will be described below.

Method of Confirming Matrix Domain Structure

The presence of the matrix domain structure in the conductive layer can be confirmed by producing a thin piece from the conductive layer and observing the fracture surface formed on the thin piece in detail. A specific procedure will be described below.

Process Cartridge

The process cartridge has the following features.

A process cartridge that is detachably attachable to a main body of an electrophotographic apparatus,
the process cartridge comprising:
a charging device for charging a surface of an electrophotographic photosensitive member; and a developing device for developing an electrostatic latent image formed on the surface of the electrophotographic photosensitive member with a toner to form a toner image on the surface of the electrophotographic photosensitive member, wherein
the developing device comprises the toner, and
the charging device comprises a conductive member arranged to be capable of contacting the electrophotographic photosensitive member.

The above-mentioned toner and conductive member can be adopted in the process cartridge.

The process cartridge may have a frame for supporting the charging device and the developing device.

Figure 4:
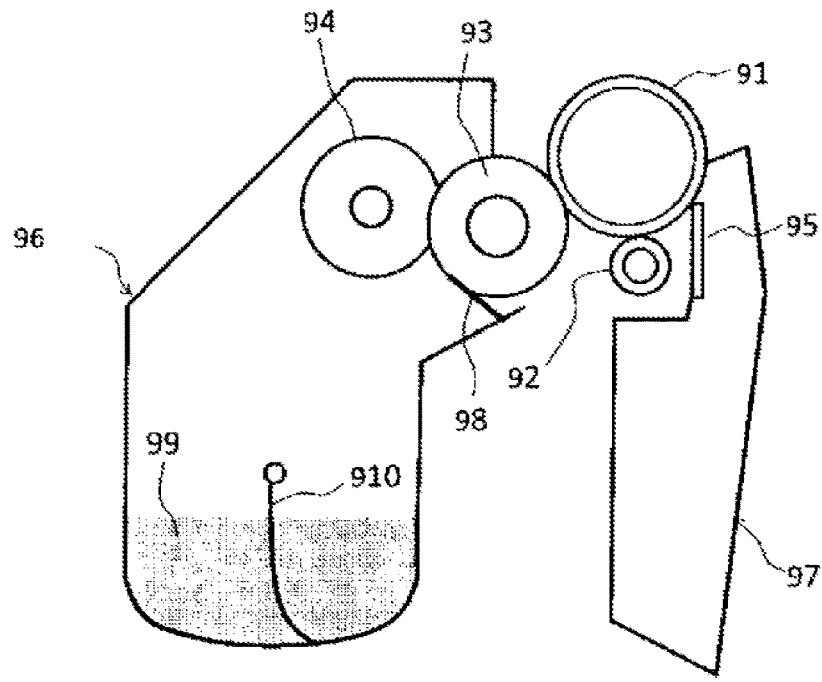
FIG. 4 is an overview diagram of a process cartridge.

FIG. 4 is a schematic cross-sectional view of a process cartridge for electrophotography that comprises a conductive member as a charging roller. This process cartridge has a developing device and a charging device integrated with each other, and is configured to be detachably attachable to the main body of the electrophotographic apparatus.

The developing device is provided with at least a developing roller 93 and has a toner 99. In the developing device, a toner supply roller 94, a toner container 96, a developing blade 98, and a stirring blade 910 may be integrated as needed.

The charging device may comprise at least a charging roller 92, and may comprise a cleaning blade 95 and a waste toner container 97. Since the conductive member may be disposed so as to be able to contact the electrophotographic photosensitive member, the electrophotographic photosensitive member (photosensitive drum 91) may be integrated with the charging device as a component of the process cartridge, or may be fixedly attached to the main body as a component of the electrophotographic apparatus.

A voltage is applied to each of the charging roller 92, the developing roller 93, the toner supply roller 94, and the developing blade 98.

Electrophotographic Apparatus

The electrophotographic apparatus has the following features.

An electrophotographic apparatus comprises:
an electrophotographic photosensitive member;
a charging device for charging a surface of the electrophotographic photosensitive member; and
a developing device for developing an electrostatic latent image formed on the surface of the electrophotographic photosensitive member with a toner to form a toner image on the surface of the electrophotographic photosensitive member, wherein
the charging device comprises a conductive member arranged to be capable of contacting the electrophotographic photosensitive member, and
the developing device comprises the toner.

The above-mentioned toner and conductive member can be adopted in the electrophotographic apparatus.

The electrophotographic apparatus may comprise
an image exposure device for irradiating the surface of the electrophotographic photosensitive member with image exposure light to form an electrostatic latent image on the surface of the electrophotographic photosensitive member;
a transfer device for transferring the toner image formed on the surface of the electrophotographic photosensitive member to a recording medium; and
a fixing device for fixing the toner image transferred onto the recording medium to the recording medium.

Figure 5:
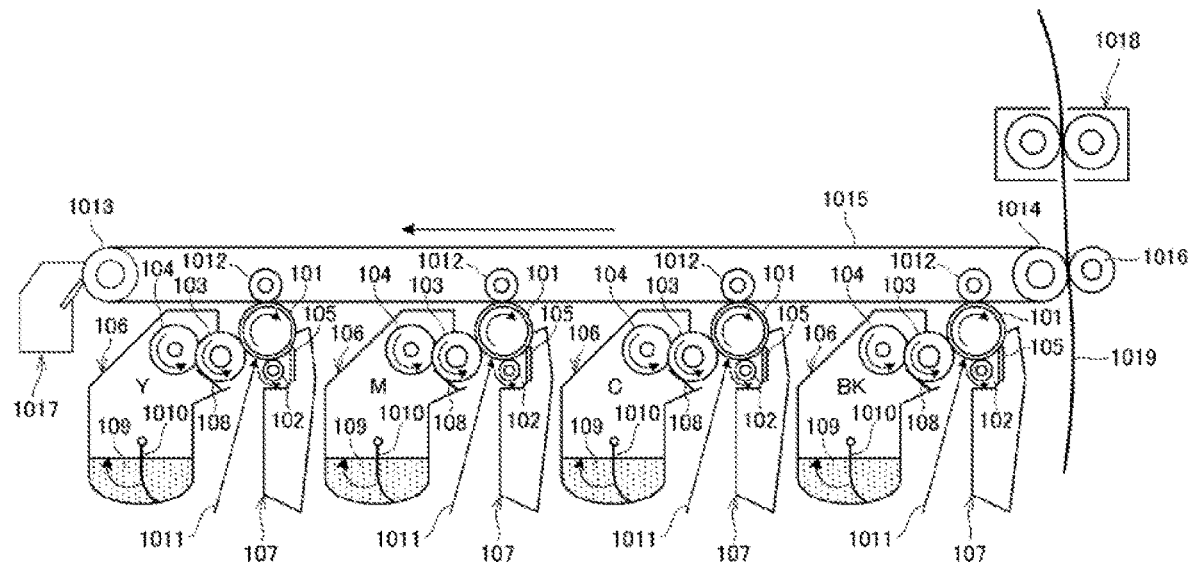
FIG. 5 is a schematic cross-sectional view of an electrophotographic apparatus.

FIG. 5 is a schematic configuration diagram of an electrophotographic apparatus using a conductive member as a charging roller. The electrophotographic apparatus is a color electrophotographic apparatus in which four process cartridges are removably mounted. In the process cartridges, toners with colors such as black, magenta, yellow, and cyan are used.

A photosensitive drum 101 rotates in the direction of the arrow and is uniformly charged by a charging roller 102 to which a voltage is applied from a charging bias power source, and an electrostatic latent image is formed on the surface of the photosensitive drum by an exposure light 1011. Meanwhile, a toner 109 stored in a toner container 106 is supplied to a toner supply roller 104 by a stirring blade 1010 and is transported onto a developing roller 103.

Then, a developing blade 108 placed in contact with the developing roller 103 uniformly coats the toner 109 on the surface of the developing roller 103, and at the same time, charges the toner 109 by triboelectric charging. The electrostatic latent image is visualized as a toner image by developing with the toner 109 transported by the developing roller 103 placed in contact with the photosensitive drum 101.

The visualized toner image on the photosensitive drum is transferred to an intermediate transfer belt 1015, which is supported and driven by a tension roller 1013 and an intermediate transfer belt driving roller 1014, by a primary transfer roller 1012 to which a voltage is applied by a primary transfer bias power source. The toner images of the respective colors are sequentially superimposed to form a color image on the intermediate transfer belt.

A transfer material 1019 is fed into the apparatus by a paper feed roller and is transported between the intermediate transfer belt 1015 and a secondary transfer roller 1016. A voltage is applied to the secondary transfer roller 1016 from a secondary transfer bias power source, and the color image on the intermediate transfer belt 1015 is transferred onto the transfer material 1019. The transfer material 1019 onto which the color image has been transferred is fixed by a fixing device 1018 and discharged to the outside of the apparatus, thereby ending the printing operation.

Meanwhile, the untransferred toner remaining on the photosensitive drum is scraped off by a cleaning blade 105 and accommodated in the waste toner accommodation container 107, and the abovementioned steps are repeated on the cleaned photosensitive drum 101. Further, the untransferred toner remaining on the primary transfer belt is also scraped off by the cleaning device 1017.

Cartridge Set

The cartridge set has the following features.

A cartridge set that is detachably attachable to a main body of an electrophotographic apparatus and comprises a first cartridge and a second cartridge, wherein the first cartridge comprises a charging device for charging a surface of an electrophotographic photosensitive member, and a first frame for supporting the charging device, the second cartridge comprises a toner container that accommodates a toner for developing an electrostatic latent image formed on the surface of the electrophotographic photosensitive member to form a toner image on the surface of the electrophotographic photosensitive member, and the charging device comprises a conductive member arranged to be capable of contacting the electrophotographic photosensitive member.

The above-mentioned toner and conductive member can be adopted in the cartridge set.

Since the conductive member can be placed in contact with the electrophotographic photosensitive member, the first cartridge may comprise the electrophotographic photosensitive member, or the electrophotographic photosensitive member may be fixedly attached to the main body of the electrophotographic apparatus. For example, the first cartridge may have an electrophotographic photosensitive member, a charging device for charging the surface of the electrophotographic photosensitive member, and a first frame member for supporting the electrophotographic photosensitive member and the charging device. The second cartridge may comprise an electrophotographic photosensitive member.

The first cartridge or the second cartridge may comprise a developing device for forming a toner image on the surface of the electrophotographic photosensitive member. The developing device may be fixedly attached to the main body of the electrophotographic apparatus.

Next, toners will be described.

The toner comprises a toner particle containing a binder resin and a crystalline material.

In observation of the cross section of the toner under a scanning transmission electron microscope, there is a domain Dc formed of a crystalline material, and the arithmetic average value of the distance between adjacent wall surfaces of the domain Dc is from 30 nm to 1,100 nm. Within the above range, the interval between the domains Dc is relatively short.

The arithmetic average value of the distance between adjacent wall surfaces of the domain Dc is preferably from 80 nm to 850 nm, more preferably from 100 nm to 350 nm, and still more preferably from 100 nm to 200 nm.

Here, the crystalline material is defined as a material having a clear endothermic peak (melting point) in measurement by a differential scanning calorimeter (DSC).

The crystalline material has crystallinity when a lamella structure in which constituent molecules, an ordered structure in the molecules, and the like are folded is formed. It is generally known that, when a crystalline material has a lamella structure, it has a property of easily transporting charges. The domain Dc formed of a crystalline material in the toner preferably has a lamella structure.

The distance between adjacent wall surfaces of the domain Dc formed of a crystalline material is relatively short. Therefore, when the toner transfers charges, the charge moves across a plurality of lamella structures of the crystalline material on the surface or the inside of the toner particles, the charge is distributed to the whole of one particle of the toner, and the toner easily holds a large amount of charges.

When the weight-average particle diameter of the toner is set as D4 (μm) and the arithmetic average value of the distance between adjacent wall surfaces between the domains Dt in the conductive layer when the outer surface of the conductive member is observed is set as Dms (μm), the following Formula (1) is satisfied.

$$D4 \geq Dms \quad (1)$$

As described above, discharging is caused using the domain Dt of the conductive member as a starting point. The distance Dms between adjacent wall surfaces of the domain Dt is a distance for a starting point of discharging according to the domain Dt. Therefore, Formula (1) indicates that the size of the toner is equal to or larger than the distance which is for the starting point of discharging.

When Formula (1) is satisfied, since the interval between the domains Dt of the conductive member is narrower than the size of the toner, negative charge according to discharging can be reliably imparted to the toner. In addition, charge propagates through a domain Dc formed of a crystalline material and spread over the entire toner, and the toner can accumulate a large amount of charges. As a result, both the domain Dt in the conductive member and the toner are strongly negatively charged, and an electrostatic repulsive force occurs between the conductive member and the toner. In this manner, it is possible to prevent the toner from contaminating the conductive member.

D4-Dms is preferably from 1.00 μm to 8.00 μm, and more preferably from 2.00 μm to 7.00 μm.

The arithmetic average value Dms of the distance between adjacent wall surfaces between the domains Dt in the conductive layer is preferably from 0.15 μm to 6.00 μm and more preferably from 0.20 μm to 2.00 μm.

In consideration of balance between developability and fixability, the weight-average particle diameter (D4) of the toner is preferably from 4.00 μm to 10.00 μm and more preferably from 4.00 μm to 9.00 μm.

Colorant

Toner particles may contain a colorant.

Examples of colorants include the following organic pigments, organic dyes, and inorganic pigments.

Examples of cyan colorants include copper phthalocyanine compounds and their derivatives, anthraquinone compounds, and basic dye lake compounds.

Examples of magenta colorants include the following: condensed azo compounds, diketopyrrolopyrrole compounds, anthraquinone compounds, quinacridone compounds, basic dye lake compounds, naphthol compounds, benzimidazolone compounds, thioindigo compounds, and perylene compounds.

Examples of yellow colorants include condensed azo compounds, isoindolinone compounds, anthraquinone compounds, azo metal complexes, methine compounds, and allylamide compounds.

Examples of black colorants include carbon black and those toned black using the above yellow colorants, magenta colorants, and cyan colorants, and a magnetic powder.

These colorants may be used alone or in combination, and additionally, may be used in a solid solution state. The colorant is selected in consideration of a hue angle, chroma, lightness, lightfastness, OHP transparency, and dispersibility in the toner particles.

The content of the colorant is preferably from 1 part by mass to 10 parts by mass with respect to 100 parts by mass of the binder resin.

Magnetic Particles

In the colorant, magnetic particles may be used for a black colorant.

When magnetic particles are used, it is preferable to comprise a core particle containing magnetic iron oxide particles and a coat layer provided on the surface of the core particle.

Regarding the core particle containing magnetic iron oxide particles, magnetic iron oxides such as magnetite, maghemite, and ferrite, and magnetic iron oxides containing other metal oxides; metals such as Fe, Co, and Ni, or alloys of these metals and metals such as Al, Co, Cu, Pb, Mg, Ni, Sn, Zn, Sb, Be, Bi, Cd, Ca, Mn, Ti, W, and V, and mixtures thereof may be exemplified.

The coat layer may cover the entire surface of the core particle uniformly or may cover the surface of the core particle that is partially exposed. In any coating mode, the coat layer is preferably the outermost layer, and the surface of the core particle is preferably thinly covered. Regarding elements that form the coat layer, Si and Al are preferably contained.

A method of forming the coat layer is not particularly limited, and known methods may be used. For example, after the core particles containing magnetite are produced, a silicon source or an aluminum source such as sodium silicate or aluminum sulfate is added to a ferrous sulfate aqueous solution. Then, air is blown while the pH and temperature of a mixed solution are adjusted and thus a coat layer containing a specific oxide may be formed on the surface of the core particle. In addition, when the amounts of the ferrous sulfate aqueous solution, sodium silicate and aluminum sulfate added are adjusted, it is possible to control the thickness of the coat layer.

In addition, in order to easily form the above coat layer and further improve magnetic properties and the tinting strength, magnetic particles preferably have an octahedral shape.

Regarding a method of controlling the shape of magnetic particles, conventionally known methods can be used. Regarding a method of forming an octahedral shape of magnetic particles, a method in which the pH during a wet oxidation reaction is set to at least 9 in producing core particles may be exemplified.

The content of the magnetic particles is preferably from 25 parts by mass to 100 parts by mass in consideration of low-temperature fixability with respect to 100 parts by mass of the binder resin. The content is more preferably from 30 parts by mass to 90 parts by mass.

Crystalline Material

The crystalline material is not particularly limited and known materials can be used.

In order for charge to be efficiently transported through the domain Dc formed of a crystalline material, the crystalline material preferably contains at least one material selected from the group consisting of an ester wax and a crystalline polyester resin.

The ester wax is a wax containing a fatty acid ester as a main component.

A preferable ester wax will be described below. Here, a functional number described below indicates the number of ester groups contained in one molecule. For example, behenyl behenate is called a monofunctional ester wax, and dipentaerythritol hexabehenate is called a hexafunctional ester wax.

Regarding the monofunctional ester wax, a condensate of an aliphatic alcohol and an aliphatic carboxylic acid is preferable. In this case, the number of aliphatic carbon atoms is preferably 6 to 26.

Examples of aliphatic alcohols include 1-hexanol, 1-heptanol, 1-octanol, 1-nonanol, 1-decanol, undecyl alcohol, and lauryl alcohol. In addition, examples of aliphatic carboxylic acids include pentanoic acid, hexanoic acid, heptanoic acid, octanoic acid, nonanoic acid, and decanoic acid.

Examples of bifunctional ester waxes include combinations of dicarboxylic acids and monoalcohols, and diols and monocarboxylic acids.

Examples of dicarboxylic acids include adipic acid, pimelic acid, suberic acid, azelaic acid, sebacic acid, and dodecanedioic acid.

Examples of diols include 1,6-hexanediol, 1,7-heptanediol, 1,8-octanediol, 1,9-nonanediol, 1,10-decanediol, 1,11-undecanediol, and 1,12-dodecanediol.

Regarding a monoalcohol condensed with a dicarboxylic acid, an aliphatic alcohol is preferable. Specific examples thereof include tetradecanol, pentadecanol, hexadecanol, heptadecanol, octadecanol, nonadecanol, eicosanol, docosanol, tricosanol, tetracosanol, pentacosanol, hexacosanol, and octacosanol.

Among these, docosanol is preferable in consideration of fixability and developability.

Regarding a monocarboxylic acid condensed with a diol, an aliphatic carboxylic acid is preferable. Specific examples of fatty acids include lauric acid, myristic acid, palmitic acid, margaric acid, stearic acid, tuberculostearic acid, arachidic acid, behenic acid, lignoceric acid, and cerotic acid. Among these, behenic acid is preferable in consideration of fixability and developability.

While linear fatty acids and linear alcohols have been exemplified here, they may have a branched structure.

The content of the ester wax is preferably from 0.5 to 20 parts by mass and more preferably from 2 to 15 parts by mass with respect to 100 parts by mass of the binder resin.

A crystalline polyester resin will be described below. The crystalline polyester resin is not particularly limited, and known resins can be used, and a saturated polyester is preferable.

In addition, the crystalline polyester resin is preferably a condensate of an aliphatic dicarboxylic acid and an aliphatic diol, and an aliphatic monocarboxylic acid and/or an aliphatic monoalcohol, and more preferably, a condensate of an aliphatic dicarboxylic acid and an aliphatic diol, and an aliphatic monocarboxylic acid.

When an aliphatic monocarboxylic acid and/or an aliphatic monoalcohol are contained as components constituting the crystalline polyester resin, it is easy to adjust the molecular weight and the hydroxyl value of the crystalline polyester resin.

Monomers that can be used will be exemplified below.

Examples of aliphatic dicarboxylic acids include oxalic acid, malonic acid, succinic acid, glutaric acid, adipic acid, pimelic acid, suberic acid, azelaic acid, sebacic acid, dodecanedioic acid, hexadecane dicarboxylic acid, and octadecane dicarboxylic acid.

Examples of aliphatic diols include ethylene glycol, diethylene glycol, triethylene glycol, 1,2-propanediol, 1,3-propanediol, dipropylene glycol, trimethylene glycol, neopentyl glycol, 1,4-butanediol, 1,5-pentanediol, 1,6-hexanediol, 1,7-heptanediol, 1,8-octanediol, 1,9-nonanediol, 1,10-decanediol, 1,11-undecanediol, 1,12-dodecanediol, 1,16-hexadecane diol, and 1,18-octadecane diol.

Examples of aliphatic monocarboxylic acids include decanoic acid (capric acid), dodecanoic acid (lauric acid), tetradecanoic acid (myristic acid), hexadecanoic acid (palmitic acid), octadecanoic acid (stearic acid), eicosanoic acid (arachidic acid), docosanoic acid (behenic acid), and tetracosanoic acid (lignoceric acid).

Examples of aliphatic monoalcohols include lauryl alcohol, stearyl alcohol, and behenyl alcohol.

When such a monocarboxylic acid and a monoalcohol are used, it is possible to obtain a crystalline polyester resin having an alkyl group (preferably having from 2 to 24 carbon atoms) at its end.

Here, since the monocarboxylic acid has one carboxylic acid, the structure derived from the monocarboxylic acid is positioned at the end of the molecular chain of the crystalline polyester resin.

The weight-average molecular weight Mw of the crystalline polyester resin is preferably from 5,000 to 60,000.

The crystalline polyester resin can be produced by a general polyester synthesis method. For example, a dicarboxylic acid component and a diol component are subjected to an esterification reaction or a transesterification reaction, and a polycondensation reaction can then be caused under a reduced pressure or a general method of introducing nitrogen gas to obtain a crystalline polyester resin.

The content of the crystalline polyester resin is preferably from 0.5 to 20 parts by mass and more preferably from 2 to 15 parts by mass with respect to 100 parts by mass of the binder resin.

The content of the crystalline material is preferably from 1 to 20 parts by mass and more preferably from 2 to 15 parts by mass with respect to 100 parts by mass of the binder resin.

It is preferable that the crystalline material contain at least one material selected from the group consisting of an ester wax and a crystalline polyester resin, and a hydrocarbon wax.

The hydrocarbon wax easily forms a crystal structure in the toner. On the other hand, an ester wax and a crystalline polyester resin have a characteristic that they do not easily form a crystal structure but are easily dispersed in the toner. When these are used in combination, the hydrocarbon wax becomes a crystal nucleus and crystallization of the ester wax or the crystalline polyester resin can be promoted. In addition, it is easy to improve dispersibility of the crystalline material in the toner. As a result, since charge can be efficiently transported through the domain Dc formed of a crystalline material, it is possible to significantly reduce adhesion of the toner to the conductive member.

The hydrocarbon wax is preferably an aliphatic hydrocarbon wax, and examples thereof include a low-molecular-weight polyethylene, a low-molecular-weight polypropylene, a microcrystalline wax, a Fischer-Tropsch wax, and a paraffin wax.

The content of the hydrocarbon wax is preferably from 0.1 to 10 parts by mass and more preferably from 0.5 to 5 parts by mass with respect to 100 parts by mass of the binder resin.

In observation of the cross section of the toner, the arithmetic average value of the number of domains Dc formed of a crystalline material in the cross section of the toner is preferably at least 20, and more preferably at least 250. If the number of domains Dc is within the above range, when the toner adheres to the conductive member, since the toner can efficiently transfer charges, it is easy to strengthen an electrostatic repulsive force between the toner and the conductive member.

The upper limit is not particularly limited, and preferably not more than 2,000 and more preferably not more than 1,500.

Binder Resin

The binder resin is not particularly limited, and the following known resins used for the toner can be used.

Examples thereof include homopolymers of styrene such as polystyrene and polyvinyltoluene and their substitution products; styrene copolymers such as a styrene-propylene copolymer, a styrene-vinyltoluene copolymer, a styrene-vinyl naphthalene copolymer, a styrene-vinyl methyl ether copolymer, a styrene-vinyl ethyl ether copolymer, a styrene-vinyl methyl ketone copolymer, a styrene-butadiene copolymer, a styrene-isoprene copolymer, a styrene-maleic acid copolymer, and a styrene-maleic acid ester copolymer; styrene acrylic resins of a styrene-methyl acrylate copolymer, a styrene-ethyl acrylate copolymer, a styrene-butyl acrylate copolymer, a styrene-octyl acrylate copolymer, a styrene-dimethylaminoethyl acrylate copolymer, a styrene-methyl methacrylate copolymer, a styrene-ethyl methacrylate copolymer, a styrene-butyl methacrylate copolymer, and a styrene-dimethylaminoethyl methacrylate copolymer; and polymethylmethacrylate, polybutylmethacrylate, polyvinyl acetate, polyethylene, polypropylene, polyvinyl butyral, a silicone resin, a polyester resin, a polyamide resin, an epoxy resin, and a polyacrylic acid resin.

These can be used alone or a plurality thereof can be used in combination. Among these, in consideration of developing characteristics and fixability, the binder resin preferably contains a styrene copolymer, a styrene acrylic resin and a polyester resin, and more preferably contains a styrene acrylic resin.

The toner may contain a charge control agent in order to stabilize its triboelectric charging property. The content of the charge control agent varies depending on its type and physical properties of materials constituting other toners, and is generally preferably from 0.1 parts by mass to 10 parts by mass and more preferably 0.1 parts by mass to 5 parts by mass with respect to 100 parts by mass of the binder resin.

A charge control agent that performs control so that the toner is negatively charged and a charge control agent that performs control so that the toner is positively charged are known, and various agents can be used alone or at least two thereof can be used in combination according to the type and applications of the toner.

Examples of agents that perform control so that the toner is negatively charged include the following.

An organometallic complex (a monoazo metal complex; an acetylacetone metal complex); a metal complex or a metal salt of an aromatic hydroxycarboxylic acid or an aromatic dicarboxylic acid; an aromatic mono- and polycarboxylic acid and their metal salts and anhydrides; and esters and phenol derivatives such as bisphenol.

Examples of agents that perform control so that the toner is positively charged include the following.

Modified products of nigrosine and fatty acid metal salts; quaternary ammonium salts such as tributylbenzylammonium-1-hydroxy-4-naphthosulfonate, and tetrabutylammonium tetrafluoroborate, and analogues thereof; onium salts such as phosphonium salts and lake pigments thereof; triphenylmethane dyes and lake pigments thereof (as a laking agent, phosphotungstic acid, phosphomolybdic acid, phosphotungstic molybdic acid, tannic acid, lauric acid, gallic acid, ferricyanide, a ferrocyanide compound, etc.); and metal salts of higher fatty acids.

Among these, a nigrosine compound, a quaternary ammonium salt, or the like is preferable.

In addition, a charge control resin can also be used and the above charge control agent can be used in combination.

Specific examples of charge control agents include the following.

Spilon Black TRH, T-77, T-95, TN-105 (commercially available from Hodogaya Chemical Co., Ltd.); BONTRON (registered trademark) S-34, S-44, E-84, E-88 (commercially available from Orient Chemical Industries Co., Ltd.); TP-302, TP-415 (commercially available from Hodogaya Chemical Co., Ltd.); BONTRON (registered trademark) N-01, N-04, N-07, P-51 (commercially available from Orient Chemical Industries Co., Ltd.); Copy Blue PR (commercially available from Clariant).

In order to improve charge stability, durable developability, flowability, and durability, the toner has one preferable form in which silica fine particles are added as an external additive to toner particles.

A specific surface area of silica fine particles measured by a BET method using nitrogen adsorption is preferably at least 30 m$^2$/g and more preferably from 50 m$^2$/g to 400 m$^2$/g. In addition, from 0.01 parts by mass to 8.00 parts by mass of silica fine particles are preferably used, and from 0.10 parts by mass to 5.00 parts by mass thereof are more preferably used with respect to 100 parts by mass of toner particles.

The BET specific surface area of the silica fine particles can be calculated by adsorbing nitrogen gas to the surface of silica fine particles using, for example, specific surface area measuring device Autosorb 1 (commercially available from Yuasa Ionics), GEMINI2360/2375 (commercially available from Micromeritics Instrument Corporation), or TriStar 3000 (commercially available from Micromeritics Instrument Corporation), according to a multipoint BET method.

As necessary, in order to control triboelectricity, preferably, the silica fine particles are treated with treatment agents such as unmodified silicone varnishes, various modified silicone varnishes, unmodified silicone oils, various modified silicone oils, silane coupling agents, silane compounds having a functional group or other organosilicon compounds or a combination with various treatment agents.

In addition, other external additives may be added to the toner as necessary. Examples of such external additives include resin fine particles or inorganic fine particles that act as a charging adjuvant, a conductivity imparting agent, a flowability imparting agent, a caking preventing agent, a release agent for heat roller fixing, a lubricant, and a polishing agent.

Examples of lubricants include polyfluorinated ethylene powder, zinc stearate powder, and polyvinylidene fluoride powder. Examples of polishing agents include cerium oxide powder, silicon carbide powder, and strontium titanate powder. Among these, strontium titanate powder is preferable.

The toner may be mixed with a carrier and used as a two-component developer. Regarding the carrier, a general carrier such as ferrite and magnetite and a resin-coated carrier can be used. In addition, a binder type carrier in which a magnetic component is dispersed in a resin can be used.

The resin-coated carrier is composed of carrier core particles and a coating material which is a resin for covering (coating) the surface of the carrier core particles. Examples of resins used for a coating material include styrene-acrylic resins such as a styrene-acrylic ester copolymer, and a styrene-methacrylic acid ester copolymer; acrylic resins such as an acrylic ester copolymer and a methacrylic acid ester copolymer; fluorine-containing resins such as polytetrafluoroethylene, a monochlorotrifluoroethylene polymer, and polyvinylidene fluoride; a silicone resin; a polyester resin; a polyamide resin; polyvinyl butyral; and an amino acrylate resin. Other examples thereof include an ionomer resin and a polyphenylene sulfide resin. These resins can be used alone or a plurality thereof can be used in combination.

Method of Producing Toner

A method of producing a toner is not particularly limited, and conventionally known production methods can be used. Hereinafter, a method of producing a toner by performing a melting and kneading step and a pulverizing step will be exemplified in detail, but the present invention is not limited thereto.

For example, a binder resin and a crystalline material, and as necessary, a colorant, a charge control agent and other additives are sufficiently mixed using a mixer such as a Henschel mixer and a ball mill (mixing step).

The obtained mixture is melt-kneaded using a heat kneader such as a twin-screw kneading extruder, a heating roller, a kneader, and an extruder (melting and kneading step).

The obtained melt-kneaded product is cooled and solidified and then pulverized using a pulverizer (pulverizing step), and classified using a classifier (classification step) to obtain toner particles. In addition, as necessary, toner particles and an external additive are mixed using a mixer such as a Henschel mixer to obtain a toner.

Examples of mixers include the following. FM mixer (commercially available from Nippon Coke & Engineering. Co., Ltd.); Super mixer (commercially available from Kawata MFG Co., Ltd.); Ribocone (commercially available from Okawara MFG. Co., Ltd.), Nauta mixer, Turbulizer, and Cyclomix (commercially available from Hosokawa Micron Corporation); spiral pin mixer (commercially available from Pacific Machinery & Engineering Co., Ltd.); and Loedige Mixer (commercially available from MATSUBO Corporation).

Examples of heat kneaders include the following. KRC kneader (commercially available from Kurimoto, Ltd.); Buss Ko-Kneader (commercially available from Buss); TEM type extruder (commercially available from Toshiba Machine Co., Ltd.); TEX Twin Screw Extruder (commercially available from The Japan Steel Works, Ltd.); PCM kneader (commercially available from Ikegai Corporation); triple roll mill, mixing roll mill, kneader (commercially available from Inoue MFG., Inc.); KNEADEX (commercially available from Mitsui Mining Co., Ltd.); M type pressure kneader, Kneader-Ruder (commercially available from Moriyama Seisakusho Co., Ltd.); and Banbury mixer (commercially available from Kobe Steel, Ltd.).

Examples of pulverizers include the following. Counter jet mill, micron jet, Inomizer (commercially available from Hosokawa Micron Corporation); IDS type mill, PJM jet pulverizer (commercially available from Nippon Pneumatic Mfg. Co., Ltd.); Crossjet mill (commercially available from Kurimoto, Ltd.); Ulmax (commercially available from Nisso Engineering Co., Ltd.); SK Jet-O-Mill (commercially available from Seishin Enterprise Co., Ltd.); Krypton (commercially available from Kawasaki Heavy Industries, Ltd.); Turbo mill (commercially available from Turbo Industry Co., Ltd.); and Super Rotor (commercially available from Nisshin Engineering Inc.).

Examples of classifiers include the following. Classiel, Micron Classifier, Spedic Classifier (commercially available from Seishin Enterprise Co., Ltd.); Turbo Classifier (commercially available from Nisshin Engineering Inc.); Micron Separator, Turboplex (ATP), TSP Separator (commercially available from Hosokawa Micron Corporation); Elbow jet (commercially available from Nittetsu Mining Co., Ltd.), Dispersion Separator (commercially available from Nippon Pneumatic Mfg. Co., Ltd.); and YM microcut (commercially available from Yasukawa Shoji K.K.).

In addition, in order to sieve coarse particles, the following sieving devices may be used.

Ultrasonic (commercially available from Koeisangyo Co., Ltd.); Rezona Sieve, Gyro Shifter (commercially available from Tokuju Corporation); vibrasonic system (commercially available from Dalton Corporation); Soniclean (commercially available from Sintokogio, Ltd.); Turbo screener (commercially available from Turbo Industry Co., Ltd.); Micro shifter (commercially available from Makino MFG. Co., Ltd.); and circular vibrating sieve.

In order to easily control the distance between adjacent wall surfaces of the domain Dc formed of a crystalline material within a suitable range, an annealing step may be performed. The annealing step is a step of crystallizing the crystalline material in the toner particles. When the annealing step is performed, it is possible to increase the number of domains formed of a crystalline material, and it is easy to narrow the distance between wall surfaces of the domain Dc.

Annealing may be performed under conditions, for example, 40° C. to 60° C., and 1 hour to 30 hours.

A ratio $\Delta H1/\Delta H2$ of an endothermic quantity $\Delta H1$ of an endothermic peak derived from a crystalline material in a first heating process of a toner measured by a differential scanning calorimeter DSC to an endothermic quantity $\Delta H2$ of an endothermic peak derived from the crystalline material in the first heating process of the toner after being left in an environment of 50° C. and a humidity RH of 25% for 24 hours is preferably from 0.65 to 1.00 and more preferably from 0.70 to 1.00.

When the toner is left in an environment of 50° C. and a humidity of 25% for 24 hours, non-crystallized components in the crystalline material are easily crystallized. When $\Delta H1/\Delta H2$ is within the above range, this indicates a state in which the crystalline material is sufficiently crystallized in the toner. When the crystalline material is sufficiently crystallized, if the toner adheres to the conductive member, since the toner can efficiently transfer charges, it is easy to strengthen an electrostatic repulsive force between the toner and the conductive member.

In order to control $\Delta H1/\Delta H2$ within the above range, for example, the affinity between a binder resin and a crystalline material is adjusted, the annealing step is performed in production of the toner, and a means of promoting crystallization of the crystalline material is used.

Method of Observing Cross Section of Toner

The distance between adjacent wall surfaces of and the number of domains Dc formed of a crystalline material in the cross section of the toner are determined by staining the cross section of the toner with ruthenium and then measuring a difference in the contrast between the crystalline material and the binder resin in the image obtained by performing observation using a scanning transmission electron microscope (STEM).

Details will be described below.

When the cross section of the toner is stained with ruthenium, since the amount of ruthenium atoms varies depending on the strength of dyeing, in a strongly dyed part, there is a large number of these atoms, an electron beam does not penetrate therethrough, and the observation image turns black, and in a weakly dyed part, an electron beam easily penetrates therethrough and the observation image turns white.

For example, the crystalline polyester resin is dyed weaker than other organic components constituting the toner. This is thought to have been caused by the fact that the dyeing material that has penetrated into the crystalline polyester resin is weaker than other organic components constituting the toner because there is a difference in the density.

Ruthenium that has not penetrated into the crystalline polyester resin is likely to remain at the interface between the crystalline polyester resin and the non-crystalline resin, and when crystals have a needle shape, the crystalline polyester resin is observed as black. On the other hand, the hydrocarbon wax is more likely to be observed as white because ruthenium penetration is further reduced.

A procedure of producing a cross section of a toner will be described below.

First, the toner is sprayed on a cover glass (commercially available from Matsunami Glass Ind., Ltd., square cover glass; square No. 1) to form a single layer and an Os film (5 nm) and a naphthalene film (20 nm) are applied as a protective film on the toner using an Osmium Plasma Coater (OPC80T commercially available from Filgen, Inc.).

Next, a PTFE tube (inner diameter Φ5 mm× outer diameter of Φ3 mm×3 mm) is filled with a photocurable resin D800 (commercially available from JEOL Ltd.), and the cover glass is gently placed on the tube so that the toner is in contact with the photocurable resin D800. In this state, light is emitted to cure the resin, the cover glass and the tube are then removed, and thus a cylindrical resin in which the toner is embedded on the outermost surface is formed.

Using an Ultrasonic Ultra Microtome (UC7 commercially available from Leica), at a cutting speed of 0.6 mm/s, a section with a length of the radius of the toner (for example, 4.0 μm when the weight-average particle diameter (D4) is 8.0 μm) is cut out from the outermost surface of the cylindrical resin, and the cross section of the toner center part is obtained.

Next, cutting is performed so that the film thickness is 250 nm and a thin piece sample of the cross section of the toner is produced. When cutting is performed using such a method, a cross section of the toner center part can be obtained.

The obtained thin piece sample is dyed using a vacuum electron dyeing device (VSC4R1H commercially available from Filgen, Inc.) in 500 Pa of a $RuO_4$ gas atmosphere for 15 minutes using a scan image mode of a scanning transmission electron microscope (JEM2800 commercially available from JEOL) to produce an STEM image.

Images are acquired with a STEM probe size of 1 nm, and an image size of 1,024×1,024 pixels. In addition, images are acquired when Contrast of the Detector Control panel of the bright field image is adjusted to 1425, Brightness is adjusted to 3750, Contrast of the Image Control panel is adjusted to 0.0, Brightness is adjusted to 0.5, and Gammma is adjusted to 1.00.

The obtained STEM image is binarized using image processing software "Image-Pro Plus (commercially available from Media Cybernetics, Inc.)."

Method of Identifying Domain Formed of Crystalline Material

Based on the STEM image of the cross section of the toner particles, the domain formed of a crystalline material is identified according to the following procedure.

When crystalline materials are available as raw materials, regarding their crystal structures, in the same manner as the above observation method using the ruthenium staining and scanning transmission electron microscope (STEM), images of lamella structures of crystals of each of the raw materials are obtained. Comparing them with the lamella structure of the domain in the cross section of the toner, when the lamella layer spacing has an error of not more than 10%, it can be identified as the raw material that forms the domain in the cross section of the toner.

When raw materials for crystalline materials are not available, an isolation operation is performed as follows. First, the toner is dispersed in ethanol which is a poor solvent for the toner and heating is performed to a temperature exceeding the melting point of the crystalline material. In this case, pressure may be applied as necessary. At this time, the crystalline material of which the temperature exceeds the melting point is melting.

Then, when solid-liquid separation is performed, a simple crystalline material or a mixture can be collected from the toner. In the case of a mixture, a plurality of crystalline materials can be isolated by sorting for each molecular weight.

Method of Measuring Distance between Adjacent Wall Surfaces of Domain Dc Formed of Crystalline Material The distance between adjacent wall surfaces of the domain Dc formed of a crystalline material is measured based on the above STEM image.

Figure 7:
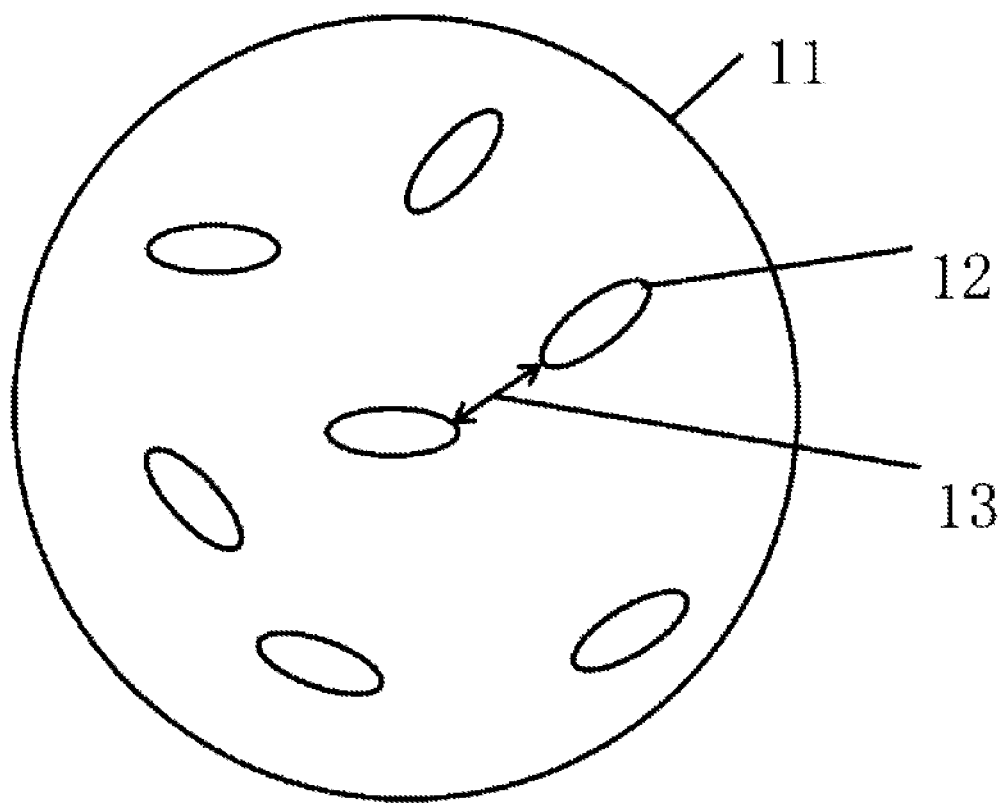
FIG. 7 is a schematic view showing a method of measuring a distance between wall surfaces of a domain Dc.

Specifically, cross sections of 100 toners are observed. The wall of the domain Dc is a contour of the domain Dc observed by the above means. The distance between wall surfaces will be described with reference to the example in FIG. 7. With respect to the domain Dc formed of a crystalline material present in a cross section 11 of the toner, a distance 13 from a contour 12 of a certain domain Dc to a contour of the nearest domain Dc is measured.

The operation is performed for all domains formed of a crystalline material in observation of the cross section of the toner. In this manner, the arithmetic average value of the obtained distances between the contours of the domain Dc is used as a distance between adjacent wall surfaces of the domain Dc formed of a crystalline material.

Method of Measuring Number of Domains Dc Formed of Crystalline
Material

Based on the above STEM image, the number of domains formed of a crystalline material contained in one cross section of the toner is measured. Measurement is performed on cross sections of 100 toners, and the arithmetic average value thereof is used as the number of domains Dc formed of a crystalline material.

Measurement of Endothermic Quantity of Endothermic Peak in Measurement of Differential Scanning calorimeter (DSC)

For measurement of the differential scanning calorimeter (DSC), Q1000 (commercially available from TA Instruments, Inc.) can be used.

Hereinafter, a procedure using Q1000 (commercially available from TA Instruments, Inc.) will be described.

3 mg of the toner is accurately weighed out and put into an aluminum pan, and an empty aluminum pan is used as a reference. When the initial temperature is set to 30° C. and the ramp rate is set to 10° C./min, heating is performed to 180° C., and an endothermic quantity ΔH1 can be obtained from an integration value from the base line of the obtained endothermic curve.

Next, the toner is left in an environment of 50° C. and a humidity of 25% for 24 hours using a high-temperature and high-humidity device (model; PR-1J commercially available from ESPEC Corp.). Using the toner that is left for 24 hours, the endothermic quantity is measured in the same manner as above to obtain ΔH2.

Measurement of Weight-average Particle Diameter (D4) of Toner

The weight-average particle diameter (D4) of the toner is calculated as follows. Regarding a measurement device, a precision particle size distribution measurement device "Coulter Counter Multisizer 3" (registered trademark, commercially available from Beckman Coulter, Inc.) having a 100 μm aperture tube and using a pore electrical resistance method is used. Bundled dedicated software "commercially available from Beckman Coulter, Inc. Multisizer 3 Version 3.51" (commercially available from Beckman Coulter, Inc.) is used to set measurement conditions and analyze measurement data. Here, the measurement is performed with 25,000 effective measurement channels.

Regarding an aqueous electrolyte solution used for measurement, those in which special grade sodium chloride is dissolved in deionized water and the concentration is about 1 mass %, for example, "ISOTON II" (commercially available from Beckman Coulter, Inc.) can be used.

Here, before measurement and analysis are performed, dedicated software is set as follows.

On the screen of "Change standard measurement method (SOM)" in dedicated software, the total count number in the control mode is set for 50,000 particles, the number of measurements is set to one, and the Kd value is set to a value obtained using "standard particle 10.0 μm" (commercially available from Beckman Coulter, Inc.). When the "measurement button of threshold value/noise level" is pressed, the threshold value and the noise level are automatically set. In addition, the current is set to 1,600 μA, the gain is set to 2, the electrolytic solution is set to ISOTON II, and "Flash aperture tube after measurement" is checked.

On the screen of "setting for converting pulse to particle diameter" in dedicated software, the bin spacing is set to a logarithmic particle diameter, the particle diameter bin is set to a 256-particle diameter bin, and the particle diameter range is set to 2 μm to 60 μm.

A specific measurement method is as follows.
(1) About 200 mL of the aqueous electrolyte solution is put into a 250 mL round bottom beaker made of glass bundled in Multisizer 3, the beaker is set on a sample stand, and stirred counterclockwise using a stirrer rod at 24 rpm. Then, contaminants and bubbles in the aperture tube are removed according to the function of "Flash aperture tube" in dedicated software.

(2) About 30 mL of the aqueous electrolyte solution is put into a 100 mL flat-bottomed beaker made of glass. About 0.3 mL of a diluted solution obtained by diluting "Contaminon N" (aqueous solution containing a nonionic surfactant, an anionic surfactant, and an organic builder and 10 mass % of a neutral detergent with a pH of 7 for washing a precision measurement device, commercially available from Wako Pure Chemical Industries, Ltd.) in deionized water about 3-fold by mass is added as a dispersing agent thereto.

(3) Two oscillators having an oscillation frequency of 50 kHz and with their phases shifted by 180 degrees are built in, and an ultrasonic disperser "Ultrasonic Dispersion System Tetora150" with an electrical output of 120 W (commercially available from Nikkaki Bios Co., Ltd.) is prepared. About 3.3 L of deionized water is put into a water tank of the ultrasonic disperser and about 2 mL of Contaminon N is added into the water tank.

(4) The beaker in the above (2) is set in a beaker fixing hole of the ultrasonic disperser, and the ultrasonic disperser is operated. Then, the height position of the beaker is adjusted so that the resonance state of the liquid surface of the aqueous electrolyte solution in the beaker becomes a maximum.

(5) When ultrasonic waves are emitted to the aqueous electrolyte solution in the beaker in the above (4), about 10 mg of the toner is added to and dispersed in the aqueous electrolyte solution little by little. Then, an ultrasonic dispersion treatment additionally continues for 60 seconds. Here, in the ultrasonic dispersion, the water temperature in the water tank is appropriately adjusted to from 10° C. to 40° C.

(6) The aqueous electrolyte solution of the above (5) in which the toner is dispersed is added dropwise to the round bottom beaker of the above (1) installed in a sample stand using a pipette, and is adjusted so that the measurement concentration is about 5%. Then, the measurement is performed until the number of measured particles reaches 50,000.

(7) The measurement data is analyzed using the dedicated software bundled to the device and the weight-average particle diameter (D4) is calculated. Here, "average diameter" on the screen of "analysis/volume statistic value (arithmetic average)" when graph/volume % is set in the dedicated software is the weight-average particle diameter (D4).

EXAMPLES

Hereinafter, the present invention will be described in more detail with reference to Examples and Comparative Examples, but the present invention is not limited to these Examples. Further, "parts" used in Examples are based on mass unless otherwise specified.

Production Example of Conductive Member 101

1-1. Preparation of Rubber Mixture for Domain Formation (CMB)

The materials shown in Table 1 were mixed in the compounding amounts shown in Table 1 by using a 6-liter pressure kneader (trade name: TD6-15MDX, manufactured by Toshin Co., Ltd.) to obtain the CMB. The mixing conditions were a filling rate of 70% by volume, a blade rotation speed of 30 rpm, and 30 min

TABLE 1

| | Name of raw material | Blending amount (parts) |
| --- | --- | --- |
| Raw matarial rubber | Styrene butadiene rubber (product name: TUFDENE 1000 commercially available from Asahi Kasei Corporation) | 100 |
| Electronic conductive agent | Carbon black (product name: Toka Black #5500 commercially available from Tokai Carbon Co., Ltd.) | 60 |
| Vulcanization acceleration aid | Zinc oxide (product name: zinc flower commercially available from Sakai Chemical Industry Co., Ltd.) | 5 |
| Processing aid | Zinc stearate (product name: SZ-2000 commercially available from Sakai Chemical Industry Co., Ltd.) | 2 |

1-2. Preparation of Matrix-Forming Rubber Mixture (MRC)

The materials shown in Table 2 were mixed in the compounding amounts shown in Table 2 by using a 6-liter pressure kneader (trade name: TD6-15MDX, manufactured by Toshin Co., Ltd.) to obtain the MRC. The mixing conditions were a filling rate of 70% by volume, a blade rotation speed of 30 rpm, and 16 min

TABLE 2

| | Name of raw material | Blending amount (parts) |
| --- | --- | --- |
| Raw matarial rubber | Butyl rubber (product name: JSR Butyl 065 commercially available from JSR Corporation) | 100 |
| Filler | Calcium carbonate (product name: NANOX #30 commercially available from Maruo Calcium Co., Ltd.) | 70 |
| Vulcanization acceleration aid | Zinc oxide (product name: zinc flower commercially available from Sakai Chemical Industry Co., Ltd.) | 7 |
| Processing aid | Zinc stearate (product name: SZ-2000 commercially available from Sakai Chemical Industry Co., Ltd.) | 2.8 |

1-3. Preparation of Unvulcanized Rubber Mixture for Forming Conductive Layer

The CMB and MRC obtained above were mixed in a compounding amount shown in Table 3 by using a 6-liter pressure kneader (trade name: TD6-15MDX, manufactured by Toshin Co., Ltd.). The mixing conditions were a filling rate of 70% by volume, a blade rotation speed of 30 rpm, and 20 min

TABLE 3

| | Name of raw material | Blending amount (Parts) |
| --- | --- | --- |
| Raw material rubber | Rubber mixture for forming domain | 25 |
| Raw material rubber | Rubber mixture for forming matrix | 75 |

Then, the vulcanizing agent and vulcanization accelerator shown in Table 4 were added in the compounding amounts shown in Table 4 to 100 parts of the mixture of CMB and MRC, and mixing was performed with an open roll having a roll diameter of 12 inches (0.30 m) to prepare a rubber mixture for forming a conductive layer.

The mixing conditions were 10 rpm for the front roll rotation and 8 rpm for the rear roll rotation, a total of 20 cuts were made on the left and right with a roll gap of 2 mm, and then thinning was performed 10 times with a roll gap of 0.5 mm.

TABLE 4

| Name of raw material | | Blending amount (parts) |
|---|---|---|
| Vulcanizing agent | Sulfur (product name: SULFAX PMC commercially available from Tsurumi Chemical Industry Co., Ltd.) | 3 |
| Vulcanization accelerator | Tetramethylthiuram disulfide (product name: TT commercially available from Ouchi Shinko Chemical Industrial Co., Ltd.) | 3 |

2. Fabrication of Conductive Member 2-1. Preparation of Support Having Conductive Outer Surface A round bar having a total length of 252 mm and an outer diameter of 6 mm which was obtained by subjecting the surface of stainless steel (SUS) to electroless nickel plating was prepared as a support having a conductive outer surface.

2-2. Formation of Conductive Layer

A die with an inner diameter of 12.5 mm was attached to the tip of a crosshead extruder having a support supply mechanism and an unvulcanized rubber roller discharge mechanism, the temperature of the extruder and the crosshead was set to 80° C., and the transport speed of the support was adjusted to 60 mm/sec. Under these conditions, the conductive layer-forming rubber mixture was supplied from the extruder, and the outer peripheral portion of the support was covered with the conductive layer-forming rubber mixture in the crosshead to obtain an unvulcanized rubber roller.

Next, the unvulcanized rubber roller was placed in a hot air vulcanizing furnace at 160° C. and heated for 60 min to vulcanize the rubber mixture for forming a conductive layer and obtain a roller in which a conductive layer was formed on the outer peripheral portion of the support. After that, both end portions of the conductive layer were cut off by 10 mm each to obtain a length of the conductive layer portion in the longitudinal direction of 231 mm 2-3. Polishing of Conductive Layer Next, when the surface of the conductive layer was polished under polishing conditions according to the following polishing conditions 1, a conductive member 101 in which the diameter of the center part in the longitudinal direction was 8.50 mm, the diameter of both ends was 8.44 mm, and a crown shape had a crown amount of 100 µm, and in which a part of the domain was exposed at the outer circumferential surface, and a protruding portion was formed was obtained.

Polishing Condition 1

A cylindrical grindstone (manufactured by Teiken Corp.) with a diameter of 305 mm and a length of 235 mm was prepared. The types of abrasive grains, the particle diameter, the degree of bonding, the binder, and the texture (abrasive grain ratio) of the abrasive grains were as follows.

Abrasive grain material: GC (green silicon carbide), (JIS R 6111-2002).

Abrasive grain size: #80 (average grain size 177 µm, JIS B 4130)

Abrasive grain bonding degree: HH (JIS R 6210)

Binder: V4PO (Vitrified)

Abrasive grain texture (abrasive grain ratio): 23 (abrasive grain content ratio 16%, JIS R 6242)

The surface of the conductive layer was polished using the grindstone under following polishing condition.

First, the rotation speed of the grindstone was 2,100 rpm, the rotation speed of the conductive member was 250 rpm, and in the coarse grinding step, the grindstone was caused to penetrate into the conductive member at a penetration speed of 20 mm/sec to a depth of 0.24 mm after contact with the outer peripheral surface of the conductive member.

In a precision polishing process, the penetration speed was changed to 1.0 mm/sec and after 0.01 mm penetration, the grindstone was separated from the conductive member to complete the polishing.

As the polishing method, an upper cut method in which the rotation directions of the grindstone and the conductive member were the same was adopted.

The preparation of the conductive member 101 was completed by the aforementioned polishing condition 1.

Methods of measuring physical properties of the conductive member are as follows.

Confirmation of Matrix Domain Structure The formation of the matrix domain structure in the conductive layer of the conductive member was confirmed by the following method.

Using a razor, a piece (thickness: 500 µm) was cut out so that a cross section orthogonal to the longitudinal direction of the conductive layer of the conductive member could be observed. Next, platinum was vapor-deposited, and a scanning electron microscope (SEM) (trade name: S-4800, manufactured by Hitachi High-Technologies Corporation) was used to capture an image at a magnification of 1,000 times to obtain a cross-sectional image.

Figure 2:
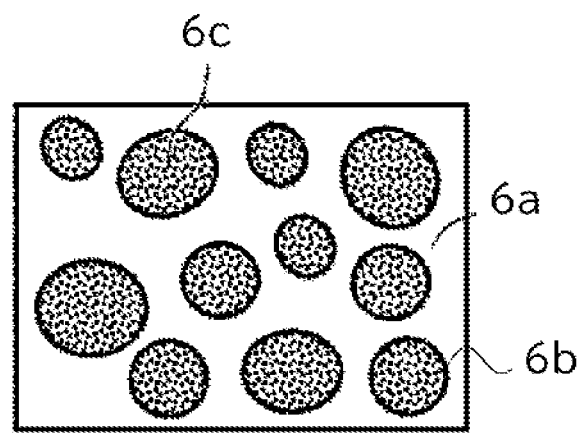
FIG. 2 is an enlarged cross-sectional view of a conductive layer.

A matrix domain structure observed in the slice from the conductive layer had a plurality of domains 6b dispersed in a matrix 6a in the cross-sectional image as shown in FIG. 2, and the domains Dt were present independently without contacting each other. The sign 6c denotes an electronic conductive agent. Meanwhile, the matrix was continuous in the image, and the domains Dt were separated by the matrix.

In order to quantify the obtained captured images, image processing software (trade name: ImageProPlus, manufactured by Media Cybernetics, Inc.) was used to convert the fracture surface images obtained by SEM observation into 8-bit grayscale and obtain a monochrome image having 256 gradations. Next, after inversion processing of the black and white of the image so that the domain Dt in the fracture surface became white, the threshold of binarization was set based on the algorithm of Otsu's discriminant analysis method for the luminance distribution of the image and a binarized image was obtained.

By the counting function for the binarized image, the number percentage K of isolated domains that were not connected to other domains Dt, as described above, was calculated with respect to the total number of domains Dt that were present in a 50 µm square area and had no contact with the frame line of the binarized image.

Specifically, in the counting function of the image processing software, the setting was made so that the domains Dt that had contact points with the frame line of the four-direction end portions of the binarized image were not counted.

The aforementioned slices were prepared from one point randomly selected from each region obtained by equally dividing the conductive layer of the conductive member into 5 parts in the longitudinal direction and equally dividing into 4 parts in the circumferential direction, that is, from a total of 20 points, and an arithmetic mean value (number %) of K when the above measurement was performed was calculated.

When the arithmetic mean value of K (number %) was 80 or more, the matrix domain structure was evaluated as "present", and when the arithmetic mean value of K (number %) was less than 80, the evaluation was "absent".

Measuring Volume Resistivity R1 of Matrix

The volume resistivity R1 of the matrix can be measured by, for example, cutting out a thin piece that has a predetermined thickness (for example, 1 μm) and includes a matrix-domain structure from the conductive layer, and bringing a microprobe of a scanning probe microscope (SPM) or an atomic force microscope (AFM) into contact with the matrix in the thin piece.

As for cutting out a thin piece from an elastic layer, for example, when the longitudinal direction of the conductive member is the X axis, the thickness direction of the conductive layer is the Z axis, and the circumferential direction is the Y axis, as shown in FIG. 3B, the thin piece is cut out so as to include at least a part of a plane parallel to the YZ plane (for example, 83*a*, 83*b*, 83*c*) perpendicular to the axial direction of the conductive member. The cutting can be performed using, for example, a sharp razor, a microtome, or a focused ion beam method (FIB).

The volume resistivity is measured by grounding one side of a thin piece cut out from the conductive layer. Then, a microprobe of a scanning probe microscope (SPM) or an atomic force microscope (AFM) is brought into contact with the matrix portion of the surface of the thin piece opposite to the ground surface, a DC voltage of 50 V is applied for 5 sec, an arithmetic mean value is calculated from the values obtained by measuring the ground current value for 5 sec, and the applied voltage is divided by the calculated value to calculate the electrical resistance value. Finally, the resistance value is converted into volume resistivity by using the film thickness of the thin piece. At this time, SPM and AFM can measure the film thickness of the thin piece at the same time as the resistance value.

The value of the volume resistivity R1 of the matrix in the columnar charging member is obtained, for example, by cutting out a sample from each area obtained by dividing the conductive layer into 4 parts in the circumferential direction and 5 parts in the longitudinal direction, obtaining the abovementioned measurement value, and calculating the arithmetic mean value of volume resistance values for a total of 20 samples.

In this example, first, a microtome (trade name: Leica EM FCS, manufactured by Leica Microsystems Inc.) was used to cut out a 1 μm-thick thin piece from the conductive layer of the conductive member at a cutting temperature of −100° C. As shown in FIG. 3B, the thin piece was cut out so as to include at least a part of an YZ plane (for example, 83*a*, 83*b*, 83*c*) perpendicular to the axial direction of the conductive member when the longitudinal direction of the conductive member was taken as X axis, the thickness direction of the conductive layer was taken as Z axis, and the circumferential direction was taken as Y axis.

In a temperature environment of 23° C. and a humidity of 50% RH, one surface of the thin piece (hereinafter, also referred to as "ground surface") was grounded on a metal plate, the surface (hereinafter, also referred to as "measurement surface") of the thin piece on the side opposite to the ground surface corresponded to the matrix, and a cantilever of a scanning probe microscope (SPM) (trade name: Q-Scope250, manufactured by Quesant Instrument Corporation) was brought into contact with a portion between the measurement surface and the ground surface where domains were not present. Subsequently, a voltage of 50 V was applied to the cantilever for 5 sec, the current value was measured, and the arithmetic mean value for 5 sec was calculated.

The surface shape of the measurement thin piece was observed with the SPM, and the thickness of the measurement location was calculated from the obtained height profile. Further, the area of the recess on the contact portion of the cantilever was calculated from the observation result of the surface shape. The volume resistivity was calculated from the thickness and the area of the recess.

The measurement was performed by producing a thin piece at a random location in each of parts obtained by dividing the conductive layer into 5 parts in the longitudinal direction and 4 parts in the circumferential direction, that is, producing a total of 20 thin pieces. The average value thereof was taken as the volume resistivity R1 of the matrix.

The scanning probe microscope (SPM) (trade name: Q-Scope250, made by Quesant Instrument Corporation) was operated in a contact mode.

Measuring Volume Resistivity R2 of Domain

The volume resistivity R2 of the domains Dt was measured by the same method as in the measurement of the volume resistivity R1 of the matrix, except that the measurement was performed at a location corresponding to the domain Dt of an ultrathin piece and the measurement voltage was set to 1 V.

In the present example, the measurement and calculation of R2 were performed in the same manner as in the above-described Measuring Volume Resistivity R1 of Matrix, except that the location on the measurement surface where the cantilever was brought into contact was changed to a location which corresponded to the domain and in which the matrix was not present between the measurement surface and the ground surface, and the applied voltage at the time of measuring the current value was changed to 1 V.

Measurement of Circle-equivalent Diameter D of Domain Observed from Cross Section of Conductive Layer The circle-equivalent diameter D of the domain Dt was measured as follows.

When the length of the conductive layer in the longitudinal direction was set as L and the thickness of the conductive layer was set as T, at three points including the center of the conductive layer in the longitudinal direction and points of L/4 from both ends to the center of the conductive layer, a sample with a thickness of 1 μm and having a surface showing cross sections 83*a*, 83*b*, and 83*c* of the conductive layer in the thickness direction as shown in FIG. 3B was cut out using a microtome (product name: Leica EM FCS, commercially available from Leica Microsystems).

Platinum was deposited on the cross section of the conductive layer in the thickness direction in each of the three obtained samples. Next, among surfaces of the samples on which platinum was deposited, three arbitrary points selected in the thickness region from the outer surface of the conductive layer to a depth of 0.1 T to 0.9 T were imaged at a magnification of 5,000 using a scanning electron microscope (SEM) (product name: S-4800, commercially available from Hitachi High-Technologies Corporation).

Each of the obtained nine captured images was binarized using image processing software (product name: ImagePro-Plus; commercially available from Media Cybernetics, Inc.) and quantified by a count function, and the arithmetic average value S of the areas of the domains contained in the captured images was calculated.

Next, the circle-equivalent diameter ($=(4S/\pi)^{0.5}$) of the domain was calculated from the arithmetic average value S of the areas of the domains calculated for the captured images. Next, the calculated average value of the circle-equivalent diameters of the domains of the captured images was calculated to obtain a circle-equivalent diameter D of the domain Dt observed from the cross section of the conductive layer of the conductive member as a measurement target.

Measurement of particle size distribution of domain Dt

In order to evaluate the uniformity of the circle-equivalent diameter D of the domain, the particle size distribution of the domain Dt was measured as follows. First, for the observation image obtained in measurement of the circle-equivalent diameter D of the domain under a scanning electron microscope (product name: S-4800, commercially available from Hitachi High-Technologies Corporation) at a magnification of 5,000, image processing software (product name: ImageProPlus; commercially available from Media Cybernetics, Inc.) was used to obtain a binarized image. Next, with respect to the domain Dt group in the binarized image, the average value D and the standard deviation σd were calculated according to a count function in the image processing software, and next, σd/D which is an index of the particle size distribution was calculated.

In measurement of the σd/D particle size distribution of the domain diameter, when the length of the conductive layer in the longitudinal direction was set as L and the thickness of the conductive layer was set as T, at three points including the center of the conductive layer in the longitudinal direction and points of L/4 from both ends to the center of the conductive layer, cross sections of the conductive layer in the thickness direction as shown in FIG. 3B were acquired. At a total of nine points including three arbitrary points in the thickness region from the outer surface of the conductive layer to a depth of 0.1 T to 0.9 T of each of the three sections obtained from the three measurement positions, a region of 50 μm square was extracted as an analysis image and measurement was performed, and the arithmetic average value at nine points was calculated.

Measurement of Distance Dm between Domains Observed from Cross Section of Conductive Layer When the length of the conductive layer in the longitudinal direction was set as L and the thickness of the conductive layer was set as T, at three points including the center of the conductive layer in the longitudinal direction and points of L/4 from both ends to the center of the conductive layer, a sample having a surface showing cross sections 83a, 83b, and 83c of the conductive layer in the thickness direction as shown in FIG. 3B was acquired.

For each of the three obtained samples, in the surface showing the cross section of the conductive layer in the thickness direction, an analysis region of 50 μm square was set at three arbitrary points in the thickness region from the outer surface of the conductive layer to a depth of 0.1 T to 0.9 T. The three analysis regions were imaged using a scanning electron microscope (product name: S-4800, commercially available from Hitachi High-Technologies Corporation) at a magnification of 5,000. Each of the nine captured images that were obtained in total was binarized using image processing software (product name: LUZEX; commercially available from Nireco Corporation).

The binarization procedure was performed as follows. The captured image was converted into 8-bit grayscale to obtain a 256-level monochrome image. Then, black and white of the image were inverted so that the domain in the captured image became white and binarization was performed to obtain a binarized image of the captured image. Next, for each of the nine binarized images, the distances between wall surfaces of the domain was calculated and additionally, an arithmetic average value thereof was calculated. This value was set as Dm. Here, the distance between wall surfaces was a distance between wall surfaces of the domains that were closest to each other (shortest distance), and was able to be obtained by setting the measurement parameter to the distance between adjacent wall surfaces in the image processing software.

Measurement of Uniformity of Distance Dm between Domains

The standard deviation σm of the distance between the domains was calculated from the distribution of the distance between wall surfaces of the domains obtained in the process of measuring the distance Dm between the domains, and a coefficient of variation σm/Dm which is an index of the uniformity of the distance between the domains was calculated.

Measurement of Convex Shape (convex height) of Outer Surface Derived from Domain Dt A thin piece with a thickness of 1 μm was cut out from the conductive layer of the conductive member at a cutting temperature of −100° C. using a microtome (product name: Leica EM FCS, commercially available from Leica Microsystems). In this case, the thin piece was a surface perpendicular to the axis of the conductive support.

Regarding the position at which cutting out was performed from the conductive layer, there were three points including the center in the longitudinal direction and points of L/4 from both ends to the center of the conductive layer when the length of the conductive layer in the longitudinal direction was set as L.

In this case, in order to confirm the convex shape derived from the domain Dt, it should be noted that no processing was performed on the surface of the conductive member. Next, regarding the section including the surface of the conductive member obtained as described above, the surface of the conductive member was measured under the following conditions using a scanning probe microscope (SPM) (product name: MFP-3D-Origin; commercially available from Oxford Instruments), and a profile and a shape profile of the electrical resistance value were measured.

Measurement mode: AM-FM mode

Probe: OMCL-AC160TS (product name; commercially available from Olympus Corporation)

Resonance frequency: 251.825 to 261.08 kHz

Spring constant: 23.59 to 25.18 N/m

Scan speed: 0.8 to 1.5 Hz

Scan size: 10 μm, 5 μm, 3 μm

Target Amplitude: 3 V and 4 V

Set Point: 2 V for all

Next, it was confirmed that the protruding portion in the profile of the shape of the surface obtained in the above measurement was derived from the domain Dt having higher conductivity than the surroundings in the profile of the electrical resistance value. In addition, the height of the convex shape was calculated from the profile.

The calculation method was obtained by calculating a difference between the arithmetic average value of the profile of the shape derived from the domain Dt and the arithmetic average value of the shape profile of adjacent matrixes. Here, the arithmetic average value was calculated from the value obtained by measuring 20 randomly selected protruding portions in each of the three cut-out sections.

Circle-equivalent Diameter Ds of Domain Observed from Outer Surface of Conductive Layer The circle-equivalent diameter Ds of the domain observed from the outer surface of the conductive layer was measured as follows.

When the length of the conductive layer in the longitudinal direction was set as L, a sample including the outer surface of the conductive layer was cut out from three points including the center of the conductive layer in the longitudinal direction and points of L/4 from both ends to the center of the conductive layer using a microtome (product name: Leica EM FCS, commercially available from Leica Microsystems). The thickness of the sample was 1 μm.

Platinum was deposited on the surface of the sample corresponding to the outer surface of the conductive layer. Three arbitrary points on the surface of the sample on which platinum was deposited were selected, and imaging was performed using a scanning electron microscope (SEM) (product name: S-4800, commercially available from Hitachi High-Technologies Corporation) at a magnification of 5,000. Each of the nine captured images that were obtained in total was binarized using image processing software (product name: ImageProPlus; commercially available from Media Cybernetics, Inc.) and quantified by a count function, and the arithmetic average value Ss of the flat area of the domain contained in each of the captured images was calculated.

Next, the circle-equivalent diameter ($=(4S/\pi)^{0.5}$) of the domain was calculated from the arithmetic average value Ss of the flat area of the domain calculated for each of the captured images. Next, the calculated average value of the circle-equivalent diameters of the domains of the captured images was calculated to obtain the circle-equivalent diameter Ds of the domain when the conductive member as a measurement target was observed from the outer surface.

Distance Dms between Adjacent Wall Surfaces of Domain Observed from Outer Surface of Conductive Member When the length of the conductive layer in the longitudinal direction was set as L and the thickness of the conductive layer was set as T, a sample including the outer surface of the conductive member was cut out from three points including the center of the conductive layer in the longitudinal direction and points of L/4 from both ends to the center of the conductive layer using a razor. The size of the sample was 2 mm in the circumferential direction and the longitudinal direction of the conductive member, and the thickness was the thickness T of the conductive member.

For each of the three obtained samples, an analysis region of 50 μm square was set at three arbitrary points on the surface corresponding to the outer surface of the conductive member, and the three analysis regions were imaged using a scanning electron microscope (product name: S-4800, commercially available from Hitachi High-Technologies Corporation) at a magnification of 5,000. Each of the nine captured images that were obtained in total was binarized using image processing software (product name: LUZEX; commercially available from Nireco Corporation).

The binarization procedure was the same as the binarization procedure performed when the distance Dm between the domains described above was determined. Next, for each of the binarized images of the nine captured images, the distance between wall surfaces of the domains was determined and additionally, the arithmetic average value thereof was calculated. This value was set as Dms.

Method of Producing Conductive Members 102 to 109

Conductive members 102 to 109 were produced in the same manner as in the conductive member 101 except that, regarding a raw material rubber, a conducting agent, a vulcanizing agent, and a vulcanization accelerator, materials and conditions shown in Table 7A-1 and Table 7A-2 were used.

Here, for details of materials shown in Table 7A-1 and Table 7A-2, rubber materials are shown in Table 7B-1, conducting agents are shown in 7B-2, and vulcanizing agents and vulcanization accelerators are shown in 7B-3.

In addition, polishing conditions 2 in Table 7A-2 were as follows.

Polishing Conditions 2

The conditions were the same as the polishing conditions 1 except that an entering speed in the precision polishing step was changed to 0.2 mm/sec, and polishing continued for 4 seconds after entering was performed to 0.01 mm.

Method of Producing Conductive Member 110

A conductive substrate C110 was produced in the same manner as in Example 1 except that materials shown in Table 5 were used as materials of an unvulcanized rubber composition, and polishing was performed under polishing conditions 2.

Next, according to the following method, a conductive resin layer was additionally provided on the conductive substrate C110 to produce a conductive member 110, and measurement was performed in the same manner as in Example 1. The results are shown in Table 8.

TABLE 5

|  | Material | Product name | Manufacturer name | Amount (parts) |
|---|---|---|---|---|
| Rubber | Epichlorohydrin rubber (ECO) | EPICHLOMER CG103 | Osaka Soda Co., Ltd. | 100 |
| Filler | Calcium carbonate | Silver W | Shiraishi Kogyo Kaisha, Ltd. | 80 |
|  | Carbon black | Thermax Flow Form N990 | Canada, Cancarb Limited | 5 |
| Plasticizer | Adipic acid ester | Polycizer W305ELS | DIC Corporation | 8 |
| Anti-aging agent | 2-mercaptobenzimidazole | MB | Tokyo Chemical Industry Co., Ltd. | 0.5 |
| Electronic conductive agent | Quaternary ammonium salt | ADK CIZER LV-70 | ADEKA Corporation | 2 |
| Vulcanization aid | Zinc stearate | SZ-2000 | Sakai Chemical Industry Co., Ltd. | 1 |
|  | Zinc oxide | Two types of zinc flower | Sakai Chemical Industry Co., Ltd. | 2 |
| Vulcanizing agent | Sulfur | SULFAX PMC | Tsurumi Chemical Industry Co., Ltd. | 0.8 |
| Vulcanization accelerator | Tetramethphiuram monosulfide | TS | Tokyo Chemical Industry Co., Ltd. | 0.5 |
|  | Dibenzothiazol sulfide | DM | Tokyo Chemical Industry Co., Ltd. | 1 |

First, methyl isobutyl ketone was added to a caprolactone modified acrylic polyol solution "Placcel DC2016" (product name, commercially available from Daicel Corporation), and the solid content was adjusted to 12 mass %. Other 5 types of materials shown in the following Table 6 were added to 834 parts of the solution (100 parts of acrylic polyol solid content) to prepare a mixed solution.

TABLE 6

| Material | Product name | Manufacturer name | Amount (parts) |
|---|---|---|---|
| Caprolactone modified acrylic polyol | Placcel DC2016 | Daicel Corporation | 100 |
| Composite conductive fine particles | CS-BF100Y | Toda Kogyo Corporation | 55 |
| Surface-treated titanium oxide particles | SMT-150B | Tayca Corp | 35 |
| Modified dimethyl silicone oil | SH28PA | Dow Corning Toray Co., Ltd. | 0.08 |
| Oxime blocked HDI nurate | TPAB-80E | Asahi Kasei Corporation | 56 |
| Oxime blocked IPDI nurate | B-1370 | DIC Corporation | 24 |

Next, 188.5 g of the mixed solution was put into a glass bottle having an inner volume of 450 mL together with 200 g of glass beads having an average particle diameter of 0.8 mm as a medium and dispersed using a paint shaker disperser for 48 hours. After the dispersion, 7.2 g of porous resin particles "Techpolymer MPB-20" (product name, commercially available from Sekisui Kasei Co., Ltd.) were added.

Here, this was an amount equivalent to 40 parts of porous resin particles with respect to 100 parts of the acrylic polyol solid content. Then, dispersion was performed for 5 minutes, and the glass beads were removed to produce a coating solution for a surface layer.

5. Formation of Surface Layer

The conductive substrate C110 was immersed in the coating solution with its longitudinal direction being the vertical direction, and a conductive resin layer was applied by the dipping method. The immersion time was 9 seconds, and regarding the pulling speed, the initial speed was 20 mm/s and the final speed was 2 mm/s, and the speed changed linearly with time therebetween. The obtained coated product was air-dried at 23° C. for 30 minutes and then dried in a hot air circulation drying furnace at a temperature of 80° C. for 30 minutes, and additionally dried at a temperature of 160° C. for 1 hour, the coating film was cured, and the conductive member 110 in which the conductive resin layer was formed on the outer circumferential part of the conductive substrate was obtained.

TABLE 7A-1

| | Conductive support | | Rubber mixture for forming domain | | | | | | | |
|---|---|---|---|---|---|---|---|---|---|---|
| | | | Raw material rubber | | | | | | Dispersion | |
| Conductive member No. | Type | Conductive surface | Material abbreviation | Product name | SP value | Mooney viscosity | Conductive agent Type | Parts | DBP | time min | Mooney viscosity |
| 101 | SUS | Ni plating | SBR | T1000 | 16.8 | 45 | #5500 | 60 | 155 | 30 | 84 |
| 102 | SUS | Ni plating | Butyl | JSR Butyl 065 | 15.8 | 32 | #5500 | 65 | 155 | 30 | 93 |
| 103 | SUS | Ni plating | SBR | T2100 | 17.0 | 78 | #5500 | 80 | 155 | 30 | 105 |
| 104 | SUS | Ni plating | NBR | N230SV | 20.0 | 32 | #7360 | 70 | 87 | 30 | 90 |
| 105 | SUS | Ni plating | NBR | N230SV | 20.0 | 32 | #7360 | 70 | 87 | 30 | 90 |
| 106 | SUS | Ni plating | NBR | N230SV | 20.0 | 32 | #7360 | 70 | 87 | 30 | 90 |
| 107 | SUS | Ni plating | NBR | N202S | 20.4 | 57 | #5500 | 90 | 155 | 30 | 102 |
| 108 | SUS | Ni plating | NBR | N202S | 20.4 | 57 | #7360 | 60 | 87 | 30 | 86 |
| 109 | SUS | Ni plating | NBR | N230SV | 19.2 | 32 | Ketjen | 10 | 360 | 30 | 50 |

Regarding the Mooney viscosities in the table, the values of the raw material rubbers were catalog values in companies. The mixture value was the Mooney viscosity $ML_{(1+4)}$ based on JIS K 6300-1: 2013, and measured at a rubber temperature when all materials constituting the CMB were kneaded.

The unit of the SP value was $(J/cm^3)^{0.5}$, and DBP indicates a DBP absorption $(cm^3/100\ g)$.

TABLE 7A-2

| Conductive member No. | Rubber mixture for forming matrix | | | | | | Unvulcanized rubber composition |
|---|---|---|---|---|---|---|---|
| | Type of raw material rubber | | | | Conductive agent | | Domain |
| | Mateial | Product name | SP value | Mooney viscosity | Type | Parts | Mooney viscosity | Parts |
| 101 | Butyl | JSR Butyl 065 | 15.8 | 32 | — | — | 40 | 25 |
| 102 | BR | T0700 | 17.1 | 43 | — | — | 53 | 21 |
| 103 | EPDM | Esplene301A | 17.0 | 44 | — | — | 48 | 15 |
| 104 | EPDM | Esplene505A | 16.0 | 47 | — | — | 52 | 25 |
| 105 | EPDM | Esplene505A | 16.0 | 47 | — | — | 52 | 25 |
| 106 | EPDM | Esplene505A | 16.0 | 47 | — | — | 52 | 25 |
| 107 | EPDM | Esplene505A | 16.0 | 47 | — | — | 52 | 15 |
| 108 | SBR | A303 | 17.0 | 46 | — | — | 52 | 22 |
| 109 | ECO | CG103 | 18.5 | 64 | LV | 3 | 64 | 20 |

| Conductive member No. | Unvulcanized rubber composition Matrix Parts | Unvulcanized rubber dispersion | | Vulcanizing agent | | Vulcanization accelerator | | Polishing condition |
|---|---|---|---|---|---|---|---|---|
| | | Rotational speed rpm | Kneading time min | Mateial | Parts | Mateial | Parts | |
| 101 | 75 | 30 | 20 | Sulfer | 3 | TT | 3 | 1 |
| 102 | 79 | 30 | 20 | Sulfer | 3 | TT | 3 | 1 |
| 103 | 85 | 30 | 20 | Sulfer | 3 | TET | 3 | 1 |
| 104 | 75 | 30 | 20 | Sulfer | 3 | TET | 1 | 1 |
| 105 | 75 | 30 | 20 | Sulfer | 3 | TET | 1 | 2 |
| 106 | 75 | 30 | 5 | Sulfer | 3 | TET | 1 | 2 |
| 107 | 85 | 30 | 10 | Sulfer | 3 | TET | 3 | 2 |
| 108 | 78 | 30 | 20 | Sulfer | 2 | TT | 2 | 2 |
| 109 | 80 | 30 | 20 | Sulfer | 3 | TBZTD | 1 | 2 |

Regarding the Mooney viscosities in the table, the values of the raw material rubbers were catalog values in companies. The mixture value was the Mooney viscosity $ML_{(1+4)}$ based on JIS K 6300-1: 2013, and measured at a rubber temperature when all materials constituting the MRC were kneaded.

TABLE 7B-1

| Material abbreviation | Material name | Product name | Manufacturer name |
|---|---|---|---|
| Butyl Butyl065 | Butyl rubber | JSR Butyl 065 | JSR Corp. |
| BR T0700 | Polybutadiene rubber | JSR T0700 | JSR Corp. |
| ECO CG103 | Epichlorohydrin rubber | EPICHLOMER CG103 | Osaka Soda Co., Ltd. |
| EPDM Esplene301A | Ethylene propylene diene rubber | Esprene301A | Sumitomo Chemical Company, Ltd. |
| EPDM Esplene505A | Ethylene propylene diene rubber | Esplene505A | Sumitomo Chemical Company, Ltd. |
| NBR DN401LL | Acrylonitrile butadiene rubber | Nipol DN401LL | Zeon Corporation |
| NBR N230SV | Acrylonitrile butadiene rubber | NBR N230SV | JSR Corp. |
| NBR N230S | Acrylonitrile butadiene rubber | NBR N230S | JSR Corp. |
| NBR N202S | Acrylonitrile butadiene rubber | NBR N202S | JSR Corp. |
| SBR T2003 | Styrene butadiene rubber | TUFDENE2003 | Asahi Kasei Corporation |
| SBR T1000 | Styrene butadiene rubber | TUFDENE1000 | Asahi Kasei Corporation |
| SBR T2100 | Styrene butadiene rubber | TUFDENE2100 | Asahi Kasei Corporation |
| SBR A303 | Styrene butadiene rubber | TUFDENE303 | Asahi Kasei Corporation |

TABLE 7B-2

| Material abbreviation | Material name | Product name | Manufacturer name |
|---|---|---|---|
| #7360 | Conductive carbon black | Toka Black #7360SB | Tokai Carbon Co., Ltd. |
| #5500 | Conductive carbon black | Toka Black #5500 | Tokai Carbon Co., Ltd. |

TABLE 7B-2-continued

| Material abbreviation | Material name | Product name | Manufacturer name |
|---|---|---|---|
| Ketjen | Conductive carbon black | Carbon ECP | Lion Specialty Chemicals Co., Ltd. |
| LV | Ion-conductive agent | LV70 | ADEKA |

TABLE 7B-3

| Material abbreviation | Material name | Product name | Manufacturer name |
|---|---|---|---|
| Sulfer | Sulfer | SULFAX PMC | Tsurumi Chemical Industry Co., Ltd. |
| TT | Tetramethylthiuram disulfide | NOCCELER TT-P | Ouchi Shinko Chemical Industrial Co., Ltd. |
| TBZTD | Tetrabenzylthiuram disulfide | SANCELER TBZT D | Sanshin Chemical Industry Co., Ltd. |
| TET | Tetraethylthiuram disulfide | SANCELER TET-G | Sanshin Chemical Industry Co., Ltd. |

TABLE 8

Evaluation of characteristics of matrix domain structure

| Conductive member No. | MD structure | Matrix R1 $\Omega$cm | Dm µm | Dms µm | R2 $\Omega$cm | R1/R2 | Domain diameter D µm | Domain diameter Ds µm | $\sigma m/Dm$ | $\sigma d/D$ | Height of protrusion nm |
|---|---|---|---|---|---|---|---|---|---|---|---|
| 101 | Yes | 5.83E+16 | 0.22 | 0.25 | 1.66E+01 | 3.5.E+15 | 0.20 | 0.20 | 0.25 | 0.22 | 184 |
| 102 | Yes | 7.00E+15 | 1.12 | 1.23 | 2.17E+01 | 3.2.E+14 | 1.12 | 1.12 | 0.23 | 0.23 | 178 |
| 103 | Yes | 4.81E+15 | 2.35 | 2.15 | 9.03E+03 | 5.3.E+11 | 2.35 | 2.35 | 0.21 | 0.21 | 162 |
| 104 | Yes | 2.01E+15 | 4.55 | 4.69 | 5.47E+01 | 3.7.E+13 | 4.55 | 4.55 | 0.23 | 0.25 | 184 |
| 105 | Yes | 6.34E+15 | 5.55 | 5.50 | 5.76E+01 | 1.1.E+14 | 4.93 | 4.93 | 0.25 | 0.26 | 12 |
| 106 | Yes | 6.31E+15 | 6.80 | 6.93 | 5.76E+01 | 1.1.E+14 | 5.65 | 5.65 | 0.25 | 0.26 | 15 |
| 107 | Yes | 6.32E+15 | 7.70 | 7.75 | 5.02E+00 | 1.3.E+15 | 5.12 | 5.12 | 0.29 | 0.31 | 14 |
| 108 | Yes | 2.09E+12 | 4.80 | 4.92 | 5.76E+01 | 3.6.E+10 | 4.12 | 4.12 | 0.33 | 0.35 | 18 |
| 109 | Yes | 1.44E+07 | 0.56 | 0.59 | 1.25E+01 | 1.2.E+06 | 1.20 | 1.20 | 0.33 | 0.36 | 9 |
| 110 | No | — | — | — | — | — | — | — | — | — | — |

In the tables, for example, "5.83E+16" indicates "5.83× $10^{16}$". In addition, the MD structure indicates the presence or absence of the matrix domain structure.

Production Example of Crystalline Material 1 (crystalline polyester resin 1)

185.5 parts of 1,9-nonanediol and 230.3 parts of sebacic acid were put into a reaction container including a nitrogen introduction tube, a dehydration tube, a stirrer and a thermocouple. Then, 1 part of tin(II) octylate as a catalyst was added to 100 parts of a total amount of monomers, and the mixture was heated at 140° C. under a nitrogen atmosphere and reacted for 8 hours while distilling off water under a normal pressure.

Next, the reaction was caused while raising the temperature to a 200° C. at 10° C./hour, and the reaction was caused for 2 hours after the temperature reached 200° C., and the pressure in the reaction container was then reduced to 5 kPa or less, and the reaction was caused at 200° C. for 3 hours to obtain a crystalline polyester resin 1.

The melting point (Tm) of the obtained crystalline polyester resin 1 was 74° C. Physical properties are shown in Table 9.

Crystalline Materials 2 and 3

Regarding crystalline materials 2 and 3, those shown in Table 9 were used.

Production Example of Non-crystalline Polyester Resin 1

The molar ratio of polyester monomers was as follows.

BPA-PO/BPA-EO/TPA/TMA=50/50/70/12

Here, abbreviations are as follows.

BPA-PO: adduct obtained by adding 2.2 mol of propylene oxide to bisphenol A, BPA-EO: adduct obtained by adding 2.2 mol of ethylene oxide to bisphenol A, TPA: terephthalic acid, and TMA: trimellitic anhydride Among the raw material monomers shown above, raw material monomers other than TMA and 0.1 parts of tetrabutyl titanate as a catalyst with respect to 100 parts of the monomers were put into a flask including a dehydration tube, a stirring blade, a nitrogen introduction tube and the like, and condensation polymerization was caused at 220° C. for 10 hours. In addition, TMA was added thereto, and the mixture was reacted at 210° C. until a desired acid value was reached, and a non-crystalline polyester resin 1 (a glass transition point Tg of 64° C., an acid value of 17 mg KOH/g, and a peak molecular weight of 6,300) was obtained.

Production Example of Toner 1

Binder resin (non-crystalline polyester resin 1): 100 parts

Crystalline material 1: 12 parts

Crystalline material 3: 2 parts

Magnetic component 1 (composition: $Fe_3O_4$, shape: spherical, average particle diameter of 0.22 µm, and magnetic properties at 795.8 kA/m; as =68 $Am^2$/kg, or =3.5 $Am^2$/kg): 80 parts T-77 (commercially available from Hodogaya Chemical Co., Ltd.): 1 part The materials were pre-mixed using an FM mixer (commercially available from Nippon Coke & Engineering. Co., Ltd.) and then melt-kneaded using a twin-screw kneading extruder (PCM-30 type commercially available from Ikegai Corporation).

The obtained kneaded product was cooled and coarsely pulverized using a hammer mill Then, an annealing treatment was performed at 50° C. for 20 hours in order to crystallize the crystalline polyester resin.

Then, pulverizing was performed using a mechanical grinder (T-250 commercially available from Turbo Industry Co., Ltd.), the obtained finely pulverized powder was classified using a multi-division classifier utilizing the Coanda effect, and negatively charged toner particles having an weight-average particle diameter (D4) of 7.0 μm were obtained. The obtained toner particles were subjected to an annealing treatment for 6 hours in a constant temperature chamber at 50° C. and a humidity RH of 25%.

1.0 part of hydrophobic silica fine particles [BET specific surface area of 150 m$^2$/g, hydrophobized with 10 parts of hexamethyldisilazane (HMDS) with respect to 100 parts of silica fine particles] was externally mixed with 100 parts of the toner particles obtained by the above steps using an FM mixer (FM-75 type commercially available from Nippon Coke & Engineering. Co., Ltd.), and sieving was performed with a mesh having openings of 150 μm to obtain a toner 1. Physical properties are shown in Table 10.

Production Examples of Toners 2 to 13

The type and the number of parts of crystalline materials and the annealing time were changed as shown in Table 10, and additionally, operating conditions of the mechanical grinder were changed so that the weight-average particle diameter D4 shown in Table 10 was obtained to produce toners 2 to 13. Physical properties are shown in Table 10.

Production Example of Toner 14
Production Example of Release Agent 1,000 g of a paraffin wax as a raw material was put into a glass cylindrical reactor, and heating was performed to 140° C. while blowing a small amount (3 L/min) of nitrogen gas. 0.30 mol of a mixed catalyst containing boric acid/boric anhydride=1.5 (molar ratio) was added thereto, and the reaction was then caused at 170° C. for 4 hours while blowing air (21 L/min) and nitrogen (18 L/min).

An equal amount of hot water (95° C.) was added to the reaction mixture obtained after the reaction was completed, and the reaction mixture was hydrolyzed to obtain a release agent.

100 g of the release agent was put into a container including a stirrer, a reflux condenser and a heating heater, 1 L of ethanol as a solvent was added thereto, heating was performed for 1 hour while stirring a reflux temperature of the solvent, and the release agent was sufficiently dissolved.

It was confirmed that the release agent was dissolved in the solvent and the temperature was then lowered to room temperature, and the release agent was precipitated. The precipitated release agent was collected by filtration, and the solvent was removed by distillation under a reduced pressure to obtain a purified release agent.

The melting point (Tm) of the obtained release agent was 77° C.

Production Example of Toner 14

450 parts of a 0.1 mol/L-Na$_3$PO$_4$ aqueous solution was added to 720 parts of deionized water, heating was performed at 60° C., and 67.7 parts of a 1.0 mol/L-CaCl$_2$ aqueous solution was then added to obtain an aqueous medium containing a dispersing agent.

Styrene: 79.0 parts
n-butyl acrylate: 21.0 parts
Divinylbenzene: 0.6 parts
Iron complex of monoazo dye (T-77: commercially available from Hodogaya Chemical Co., Ltd.): 1.5 parts
Magnetic component 1: 90.0 parts
Saturated polyester resin: 3.0 parts
(Saturated polyester resin obtained according to a polycondensation reaction of an adduct obtained by adding 2 mol of ethylene oxide to bisphenol A and terephthalic acid; number-average molecular weight=5,000, acid value=6 mg KOH/g, glass transition temperature=68° C.)

The above formulation was uniformly dispersed and mixed using an attritor (commercially available from Mitsui Miike Machinery Co., Ltd.). Then, heating was performed at 63° C., and 5.0 parts of a crystalline polyester resin 1, 5.0 parts of dibehenyl sebacate (melting point of 73° C.) and 8.0 parts of the above release agent (melting point of 77° C.) were added and mixed and dissolved. Then, 9.0 parts of tert-butyl peroxypivalate as a polymerization initiator was additionally dissolved to obtain a polymerizable monomer composition.

The polymerizable monomer composition was added to the aqueous medium, and the mixture was stirred at 60° C. under a nitrogen atmosphere using a TK type homo mixer (commercially available from Tokushu Kika Kogyo Co., Ltd.) at 12,000 rpm for 10 minutes to form particles of the polymerizable monomer composition.

Then, the polymerization reaction was caused at 70° C. for 4 hours while stirring with a paddle stirring blade. After the reaction was completed, a dispersion containing the obtained resin particles was heated to 100° C. and left for 2 hours.

Then, regarding a cooling step, ice was added to the dispersion, and the dispersion was cooled from 100° C. to 20° C. for 2 minutes.

Then, hydrochloric acid was added to the cooled dispersion and washing was performed, and filtration and drying were then performed to obtain toner particles 14. The glass transition temperature (Tg) was 52° C.

100 parts of the toner particles 14 and 0.8 parts of hydrophobic silica fine particles having a BET value of 300 m$^2$/g and a number-average particle diameter of primary particles of 8 nm were mixed using an FM mixer (commercially available from Nippon Coke & Engineering. Co., Ltd.) to obtain a toner 14. Physical properties are shown in Table 10.

TABLE 9

| Crystalline material | | Content | Melting point (° C.) |
|---|---|---|---|
| Crystalline material 1 | Crystalline polyester | | 74 |
| Crystalline material 2 | Beniher behenate | | 73 |
| Crystalline material 3 | Hydrocarbon wax | | 105 |

TABLE 10

| Toner | Crystalline material (1) No. | Parts | Crystalline material (2) No. | Parts | Annealing (time) | Weight-average particle diameter Dv (μm) | Crystal material domain Dc Distance between walls (nm) | Number | ΔH1 | ΔH1/ΔH2 |
|---|---|---|---|---|---|---|---|---|---|---|
| Toner 1 | Crystalline material 1 | 12 | Crystalline material 3 | 2 | 6 | 7.00 | 150 | 1000 | 20.00 | 0.95 |
| Toner 2 | Crystalline material 1 | 12 | Crystalline material 3 | 2 | 4 | 7.00 | 300 | 300 | 15.20 | 0.70 |
| Toner 3 | Crystalline material 1 | 12 | Crystalline material 3 | 2 | 2 | 7.00 | 800 | 20 | 14.30 | 0.60 |
| Toner 4 | Crystalline material 1 | 8 | Crystalline material 3 | 2 | — | 7.00 | 1000 | 12 | 11.00 | 0.60 |
| Toner 5 | Crystalline material 2 | 8 | Crystalline material 3 | 2 | — | 7.00 | 1000 | 12 | 11.00 | 0.60 |
| Toner 6 | Crystalline material 2 | 10 | — | — | — | 7.00 | 1000 | 12 | 10.00 | 0.55 |
| Toner 7 | Crystalline material 3 | 10 | — | — | — | 7.00 | 1000 | 12 | 17.50 | 0.95 |
| Toner 8 | Crystalline material 3 | 10 | — | — | — | 5.60 | 1000 | 12 | 17.50 | 0.95 |
| Toner 9 | Crystalline material 3 | 10 | — | — | — | 8.00 | 1000 | 12 | 17.50 | 0.95 |
| Toner 10 | Crystalline material 3 | 6 | — | — | — | 7.00 | 1500 | 4 | 10.00 | 0.95 |
| Toner 11 | Crystalline material 1 | 6 | — | — | — | 7.00 | 1000 | 4 | 6.50 | 0.60 |
| Toner 12 | Crystalline material 3 | 10 | — | — | — | 5.30 | 1000 | 12 | 17.50 | 0.95 |
| Toner 13 | Crystalline material 3 | 10 | — | — | — | 6.50 | 1000 | 12 | 17.50 | 0.95 |
| Toner 14 | Described in document | | | | | 7.00 | 200 | 100 | 24.00 | 0.95 |

Example 1

In consideration of a future higher speed of a printer, a laser printer (product name: HP LaserJet Enterprise M609dn; commercially available from HP) was used at a process speed modified to 450 mm/sec. A combination of these electrophotographic apparatus and process cartridge corresponded to the configuration shown in FIG. 5. A toner 1 and a conductive member 101 were evaluated, and the results are shown in Table 11.

Low-temperature Fixability: Evaluation of Spot Missing of Solid Image

In order to obtain a rubbing density reduction rate, an external fixing unit that was modified by removing a fixing unit of the evaluation machine to the outside so that the temperature of the fixing unit could be arbitrarily set, and a process speed was 450 mm/sec was used.

An unfixed image in which a toner laid-on level per unit area was set to 1.0 mg/cm$^2$ was passed through the fixing unit set at 180° C. using the above device under a room temperature and normal humidity environment (a temperature of 25° C. and a humidity RH of 45%). Regarding the evaluation paper, FOX RIVER BOND paper (110 g/m$^2$) which is a cardboard having an unevenness that is disadvantageous in low-temperature fixability was used.

In the obtained solid fixed image, a part in which the toner was leaked and which appeared white was defined as a spot missing occurrence part, and the number of missing spots was counted. A smaller number of missing spots indicates better fixability.

Evaluation of Non-uniformity of Fine Lines

A difference (μm) in the width of a thick portion and a thin portion of the fine lines when the average width of the fine lines was set to 180 μm was measured using the above device under a room temperature and normal humidity environment (a temperature of 25° C. and a humidity RH of 45%). An A4 color laser copy paper (commercially available from Canon Inc., basis weight of 80 g/m$^2$) was used. A smaller difference in the thickness indicates better stability of the thickness of the fine lines.

Evaluation of Non-uniformity of Fine Lines after Durable Test

Durable printing of 200,000 horizontal line images with a print rate of 5% was performed under a room temperature and normal humidity environment (a temperature of 25° C. and a humidity RH of 45%) using the above device. After durable printing, 20 fine lines set at 180 μm were printed, and a difference (μm) in the width between a thick portion and a thin portion of the fine lines was measured. An A4 color laser copy paper (commercially available from Canon Inc., a basis weight of 80 g/m$^2$) was used. A smaller difference in the thickness indicates better stability of the fine lines.

Evaluation of Non-uniformity of Fine Lines in Low Temperature and Low Humidity Environment The same test was performed under a low temperature and low humidity environment (a temperature of 15° C. and a humidity RH of 10%), and non-uniformity of the fine lines before and after the durable test was evaluated.

In the low temperature and low humidity environment, an electrostatic adhesive force was likely to act between the toner and the conductive member, and thus the toner was likely to adhere to the conductive member. Therefore, it was difficult to evaluate non-uniformity of the fine lines. A smaller difference in the thickness indicates better stability of the thickness of the fine lines.

Examples 2 to 15

Table 11 shows the results of the above evaluations using the toner and the conductive member in combinations shown in Table 11.

In all cases, regarding the difference in the thickness of the fine lines, favorable results were obtained before and after the durable test.

Comparative Examples 1 to 7

Table 12 shows the results of the above evaluations using the toner and the conductive member in combinations shown in Table 12.

In all cases, in evaluation of the fine lines after the durable test, the difference in the thickness of the fine lines was large.

TABLE 11

| Example | Toner | Conductive member | Low-temperature fixability | Non-uniformity of fine lines (RT and RH environment) | | Non-uniformity of fine lines (LT and LH environment) | |
|---|---|---|---|---|---|---|---|
| | | | | Initial durable test | After durable test | Initial durable test | After durable test |
| Example 1 | Toner 1 | Conductive member 101 | 1 | 5 | 6 | 5 | 6 |
| Example 2 | Toner 2 | Conductive member 101 | 3 | 5 | 6 | 6 | 10 |
| Example 3 | Toner 3 | Conductive member 101 | 5 | 5 | 7 | 6 | 12 |
| Example 4 | Toner 4 | Conductive member 101 | 9 | 6 | 8 | 6 | 14 |
| Example 5 | Toner 5 | Conductive member 101 | 11 | 6 | 9 | 7 | 14 |
| Example 6 | Toner 6 | Conductive member 101 | 15 | 5 | 10 | 6 | 20 |
| Example 7 | Toner 7 | Conductive member 101 | 18 | 7 | 10 | 7 | 26 |
| Example 8 | Toner 7 | Conductive member 102 | 18 | 5 | 12 | 6 | 27 |
| Example 9 | Toner 7 | Conductive member 103 | 18 | 6 | 13 | 7 | 31 |
| Example 10 | Toner 7 | Conductive member 104 | 18 | 7 | 14 | 8 | 32 |
| Example 11 | Toner 7 | Conductive member 105 | 18 | 6 | 16 | 7 | 36 |
| Example 12 | Toner 8 | Conductive member 105 | 14 | 5 | 17 | 6 | 37 |
| Example 13 | Toner 7 | Conductive member 106 | 18 | 7 | 17 | 8 | 37 |
| Example 14 | Toner 9 | Conductive member 108 | 20 | 6 | 20 | 7 | 37 |
| Example 15 | Toner 7 | Conductive member 108 | 18 | 5 | 21 | 6 | 39 |

In the table, "RT and RH" means "room temperature and normal humidity" and "LT and LH" means "low temperature and low humidity environment". It is true for table 12.

TABLE 12

| Comparative Example | Toner | Conductive member | Low-temperature fixability | Non-uniformity of fine lines (RT and RH environment) | | Non-uniformity of fine lines (LT and LH environment) | |
|---|---|---|---|---|---|---|---|
| | | | | Initial durable test | After durable test | Initial durable test | After durable test |
| Comparative Example 1 | Toner 10 | Conductive member 107 | 26 | 5 | 22 | 6 | 55 |
| Comparative Example 2 | Toner 11 | Conductive member 107 | 26 | 6 | 24 | 7 | 56 |
| Comparative Example 3 | Toner 12 | Conductive member 106 | 13 | 7 | 23 | 7 | 68 |
| Comparative Example 4 | Toner 13 | Conductive member 107 | 16 | 5 | 24 | 5 | 72 |
| Comparative Example 5 | Toner 7 | Conductive member 109 | 18 | 6 | 26 | 7 | 75 |

TABLE 12-continued

| Comparative Example | Toner | Conductive member | Low-temperature fixability | Non-uniformity of fine lines (RT and RH environment) | | Non-uniformity of fine lines (LT and LH environment) | |
|---|---|---|---|---|---|---|---|
| | | | | Initial durable test | After durable test | Initial durable test | After durable test |
| Comparative Example 6 | Toner 7 | Conductive member 110 | 18 | 7 | 25 | 7 | 85 |
| Comparative Example 7 | Toner 14 | Conductive member 110 | 5 | 5 | 27 | 6 | 88 |

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2019-191588, filed Oct. 18, 2019 which is hereby incorporated by reference herein in its entirety.

What is claimed is:

1. An electrophotographic apparatus comprising:
an electrophotographic photosensitive member;
a charging device for charging a surface of the electrophotographic photosensitive member; and
a developing device for developing an electrostatic latent image formed on the surface of the electrophotographic photosensitive member with a toner to form a toner image on the surface of the electrophotographic photosensitive member, wherein
the charging device comprises a conductive member arranged to be capable of contacting the electrophotographic photosensitive member,
the conductive member comprises a support having a conductive outer surface and a conductive layer provided on the outer surface of the support,
the conductive layer comprises a matrix and a plurality of domains Dt dispersed in the matrix,
the matrix contains a first rubber,
each of the domains Dt contain a second rubber and an electronic conductive agent,
at least a part of the domains Dt is exposed at the outer surface of the conductive member,
the outer surface of the conductive member is composed of at least the matrix and the domains Dt exposed at the outer surface of the conductive member,
the matrix has a volume resistivity R1 of larger than $1.00 \times 10^{12}$ Ω·cm,
the domains Dt has a volume resistivity R2 of smaller than the volume resistivity R1 of the matrix,
the developing device comprises the toner,
the toner comprises a toner particle containing a binder resin and a crystalline material,
in observation of a cross section of the toner under a scanning transmission electron microscope, domains Dc formed of the crystalline material exist,
an arithmetic average value of distances between adjacent wall surfaces of the domains Dc is from 30 to 1,100 nm, and
when a weight-average particle diameter of the toner is D4 and an arithmetic average value of distances between adjacent wall surfaces between the domains Dt in the conductive layer when the outer surface of the conductive member is observed is Dms, Formula (1) below is satisfied:

$$D4 \geq Dms \qquad (1).$$

2. The electrophotographic apparatus according to claim 1, wherein the Dms is from 0.15 to 6.00 μm.

3. The electrophotographic apparatus according to claim 1, wherein the domains Dt form protruding portions on the outer surface of the conductive member.

4. The electrophotographic apparatus according to claim 1, wherein the crystalline material contains at least one material selected from the group consisting of an ester wax and a crystalline polyester resin.

5. The electrophotographic apparatus according to claim 1, wherein the crystalline material contains
at least one material selected from the group consisting of an ester wax and a crystalline polyester resin, and
a hydrocarbon wax.

6. The electrophotographic apparatus according to claim 1, wherein, in observation of a cross section of the toner, an arithmetic average value of the number of domains Dc formed of the crystalline material in the cross section of the toner is at least 20.

7. The electrophotographic apparatus according to claim 1, wherein a ratio ΔH1/ΔH2 of an endothermic quantity ΔH1 of an endothermic peak derived from the crystalline material in a first heating process for the toner to an endothermic quantity ΔH2 of an endothermic peak derived from the crystalline material in the first heating process for the toner after being left in an environment of 50° C. and a humidity RH of 25% for 24 hours, as measured by a differential scanning calorimeter DSC, is from 0.65 to 1.00.

8. The electrophotographic apparatus according to claim 1, wherein the volume resistivity R1 of the matrix is at least $1.0 \times 10^5$ times the volume resistivity R2 of the domains Dt.

9. The electrophotographic apparatus according to claim 1, wherein
the domains Dt form protruding portions on the outer surface of the conductive member, and
an average value of heights of the protruding portions formed by the domains Dt is from 50 to 250 nm.

10. The electrophotographic apparatus according to claim 1, wherein an arithmetic average value of circle-equivalent diameters D of the domains Dt is from 0.10 to 5.00 μm.

11. A process cartridge detachably attachable to a main body of an electrophotographic apparatus, wherein
the process cartridge comprises
a charging device for charging a surface of an electrophotographic photosensitive member and
a developing device for developing an electrostatic latent image formed on the surface of the electrophotographic photosensitive member with a toner to form a toner image on the surface of the electrophotographic photosensitive member, the charging device comprises a conductive member that is arranged to be capable of contacting the electrophotographic photosensitive member, the conductive member comprises a support having a conductive outer surface and a conductive layer provided on the outer surface of the support, the conductive layer comprises a matrix and a plurality of domains Dt dispersed in the matrix, the matrix contains a first rubber, each of the domains Dt contain a second rubber and an electronic conductive agent, at least a part of the domains Dt is exposed at the outer surface of the conductive member, the outer surface of the conductive member is composed of at least the matrix and the domains Dt exposed at the outer surface of the conductive member, the matrix has a volume resistivity R1 of larger than $1.00 \times 10^{12}$ Ω·cm, the domains Dt has a volume resistivity R2 of smaller than the volume resistivity R1 of the matrix, the developing device comprises the toner, the toner comprises a toner particle containing a binder resin and a crystalline material, in observation of a cross section of the toner under a scanning transmission electron microscope, domains Dc formed of the crystalline material exist, an arithmetic average value of distances between adjacent wall surfaces of the domains Dc is from 30 to 1,100 nm, and when a weight-average particle diameter of the toner is D4 and an arithmetic average value of distances between adjacent wall surfaces between the domains Dt in the conductive layer when the outer surface of the conductive member is observed is Dms, Formula (1) below is satisfied:

$$D4 \geq Dms \quad (1).$$

12. A cartridge set having a first cartridge and a second cartridge detachably attachable to a main body of an electrophotographic apparatus, wherein the first cartridge comprises a charging device for charging a surface of an electrophotographic photosensitive member and a first frame for supporting the charging device, the second cartridge comprises a toner container containing a toner for developing an electrostatic latent image formed on the surface of the electrophotographic photosensitive member to form a toner image on the surface of the electrophotographic photosensitive member, the charging device comprises a conductive member that is arranged to be capable of contacting the electrophotographic photosensitive member, the conductive member comprises a support having a conductive outer surface and a conductive layer provided on the outer surface of the support, the conductive layer comprises a matrix and a plurality of domains Dt dispersed in the matrix, the matrix contains a first rubber, each of the domains Dt contain a second rubber and an electronic conductive agent, at least a part of the domains Dt is exposed at the outer surface of the conductive member, the outer surface of the conductive member is composed of at least the matrix and the domains Dt exposed at the outer surface of the conductive member, the matrix has a volume resistivity R1 of larger than $1.00 \times 10^{12}$ Ω·cm, the domains Dt has a volume resistivity R2 of smaller than the volume resistivity R1 of the matrix, the toner comprises a toner particle containing a binder resin and a crystalline material, in observation of a cross section of the toner under a scanning transmission electron microscope, domains Dc formed of the crystalline material exist, an arithmetic average value of distances between adjacent wall surfaces of the domains Dc is from 30 to 1,100 nm, and when a weight-average particle diameter of the toner is D4 and an arithmetic average value of distances between adjacent wall surfaces between the domains Dt in the conductive layer when the outer surface of the conductive member is observed is Dms, Formula (1) below is satisfied:

$$D4 \geq Dms \quad (1).$$

* * * * *